(12) United States Patent
Kouichi et al.

(10) Patent No.: US 9,278,708 B2
(45) Date of Patent: Mar. 8, 2016

(54) ELECTRIC POWER STEERING APPARATUS

(75) Inventors: Satoh Kouichi, Maebashi (JP); Keiji Kashimoto, Maebashi (JP); Haruhiko Kamiguchi, Maebashi (JP)

(73) Assignee: NSK LTD., Tokyo (JP)

( * ) Notice: Subject to any disclaimer, the term of this patent is extended or adjusted under 35 U.S.C. 154(b) by 56 days.

(21) Appl. No.: 14/131,809

(22) PCT Filed: Sep. 3, 2012

(86) PCT No.: PCT/JP2012/072356
§ 371 (c)(1),
(2), (4) Date: Mar. 11, 2014

(87) PCT Pub. No.: WO2013/118339
PCT Pub. Date: Aug. 15, 2013

(65) Prior Publication Data
US 2014/0195119 A1    Jul. 10, 2014

(30) Foreign Application Priority Data

Feb. 6, 2012  (JP) ................................ 2012-022811
Feb. 6, 2012  (JP) ................................ 2012-022814
Feb. 7, 2012  (JP) ................................ 2012-024209

(51) Int. Cl.
B62D 5/04      (2006.01)
H02P 29/02     (2006.01)
H02P 6/00      (2006.01)

(52) U.S. Cl.
CPC ............ *B62D 5/0463* (2013.01); *B62D 5/0469* (2013.01); *B62D 5/0496* (2013.01); *H02P 6/002* (2013.01); *H02P 29/028* (2013.01)

(58) Field of Classification Search
None
See application file for complete search history.

(56) References Cited

U.S. PATENT DOCUMENTS

| | | | |
|---|---|---|---|
| 5,150,021 A | 9/1992 | Kamono et al. | |
| 6,520,279 B2 * | 2/2003 | Fukumoto et al. | 180/446 |
| 7,091,686 B2 * | 8/2006 | Kagei | 318/434 |
| 2001/0026134 A1 * | 10/2001 | Fukumoto et al. | 318/430 |
| 2005/0087387 A1 * | 4/2005 | Ueda et al. | 180/443 |
| 2012/0211299 A1 * | 8/2012 | Yanai | 180/446 |
| 2013/0033210 A1 * | 2/2013 | Suzuki et al. | 318/400.22 |
| 2013/0320747 A1 * | 12/2013 | Ozaki | 301/6.5 |
| 2013/0341109 A1 * | 12/2013 | Ozaki | 180/65.51 |
| 2013/0342148 A1 * | 12/2013 | Yanai | 318/472 |

FOREIGN PATENT DOCUMENTS

| | | | |
|---|---|---|---|
| EP | 1935753 A1 | 6/2008 | |
| JP | 3-114971 A | 5/1991 | |
| JP | 6-72349 A | 3/1994 | |

(Continued)

*Primary Examiner* — Yonel Beaulieu
*Assistant Examiner* — Krishnan Ramesh
(74) *Attorney, Agent, or Firm* — Sughrue Mion, PLLC

(57) ABSTRACT

An electric power steering apparatus for generating a PWM signal based on a calculated steering assist command value, PWM-controlling a motor via a motor drive circuit including switching elements, and assist-controlling a steering system that a motor relay is inserted between the motor drive circuit and the motor, includes a steering status detecting section that detects a steering status of a steering wheel, outputs a longtime steering holding signal when detecting that the steering status is a longtime steering holding status, and outputs a normal steering signal when detecting that the steering status is a normal steering status, and a motor current control section that determines a motor current control value for controlling a motor current flowing in the motor relay in accordance with the longtime steering holding signal or the normal steering signal.

7 Claims, 18 Drawing Sheets

(56) References Cited

FOREIGN PATENT DOCUMENTS

| | | | |
|---|---|---|---|
| JP | 8-91239 A | 4/1996 |
| JP | 2006-341795 A | 12/2006 |
| JP | 2008-62916 A | 3/2008 |
| JP | 2008-105652 A | 5/2008 |
| JP | 2010-132206 A | 6/2010 |

* cited by examiner

PRIOR ART

PRIOR ART

PRIOR ART

ELECTRIC POWER STEERING APPARATUS

CROSS REFERENCE TO RELATED APPLICATIONS

This application is a National Stage of International Application No. PCT/JP2012/072356 filed Sep. 3, 2012, claiming priority based on Japanese Patent Application Nos. 2012-022811 and 2012-022814 filed Feb. 6, 2012 and 2012-024209 filed Feb. 7, 2012, the contents of all of which are incorporated herein by reference in their entirety.

TECHNICAL FIELD

The present invention relates to an electric power steering apparatus that provides a steering system of a vehicle with an assist force generated by a brushless DC motor, and in particular to an electric power steering apparatus capable of keeping torque variations at a low level by limiting a continuous energization time of a high current flowing in an electromagnetic type motor relay that supplies a current to the brushless DC motor and controlling so as to gradually decrease the high current flowing in the motor relay.

Furthermore, the present invention relates to an electric power steering apparatus that estimates a relay-spring-portion-temperature or a relay-coil-portion-temperature of an electromagnetic type motor relay that supplies a current to a brushless DC motor, compares an estimated temperature with a given temperature (a threshold) and controls (decreases or increases) a relay current in accordance with a comparison result.

BACKGROUND ART

An electric power steering apparatus which provides a steering mechanism of a vehicle with a steering assist torque (an assist torque) by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a current supplied to the motor so that a difference between a steering assist command value (a current command value) and a detected motor current value becomes small, and the adjustment of the current applied to the motor is generally performed by an adjustment of a duty ratio of a PWM (Pulse Width Modulation) control.

A general configuration of a conventional electric power steering apparatus will be described with reference to FIG. 1. As shown in FIG. 1, a column shaft (a steering shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit 100 for controlling the electric power steering apparatus from a battery 13, and an ignition key signal is inputted into the control unit 100 through an ignition key 11. The control unit 100 calculates a steering assist command value of an assist (steering assist) command based on a steering torque Tr detected by the torque sensor 10 and a velocity Vel detected by a velocity sensor 12, and controls a current supplied to the motor 20 based on a current control value E obtained by performing compensation and so on with respect to the steering assist command value. Moreover, it is also possible to receive the velocity Vel from a CAN (Controller Area Network) and so on.

The control unit 100 mainly comprises a CPU (or an MPU or an MCU), and general functions performed by programs within the CPU are shown in FIG. 2.

Functions and operations of the control unit 100 will be described with reference to FIG. 2. As shown in FIG. 2, the steering torque Tr detected by the torque sensor 10 and the velocity Vel from the velocity sensor 12 are inputted into a steering assist command value calculating section 101, and a steering assist command value Iref is calculated by means of an assist map. The calculated steering assist command value Iref is inputted into a maximum output limiting section 102 and an output is limited based on an overheat protection condition or the like in the maximum output limiting section 102. A current command value I that maximum output is limited, is inputted into a subtraction section 103.

Moreover, with respect to the calculation of the steering assist command value Iref performed in the steering assist command value calculating section 101, it is also possible to calculate the steering assist command value Iref by using not only the steering torque Tr and the velocity Vel but also a steering angle.

The subtraction section 103 calculates a deviation $\Delta I (=I-i)$ between the current command value I and a motor current of the motor 20 that is fed back, the deviation $\Delta I$ is controlled by a current control section 104 such as a PI (proportional and integral) or the like, the controlled current control value E is inputted into a PWM control section 105 and the duty ratio is calculated, and in accordance with a PWM signal PS that the duty ratio is calculated, the motor 20 is driven through a motor drive circuit 106. The motor current i of the motor 20 is detected by a motor current detection circuit 107, and the motor current i is inputted into the subtraction section 103 to feed back.

A bridge circuit that bridge-connects semiconductor switching elements (EFTs) and the motor, is used in the motor drive circuit that controls the motor current by means of the current control value E and drives the motor. The motor drive circuit that is configured so as to control the motor current by ON/OFF-controlling the semiconductor switching elements in accordance with the duty ratio of the PWM signal determined based on the current control value E, is widely used. Recently, a brushless DC motor is used as the motor. Hereinafter, a motor drive circuit of a three-phase brushless DC motor will be described in brief.

The brushless DC motor is constructed so that an armature coil is wound around a stator, a rotor is comprised of permanent magnets, and determining the timing of a direct current flowing in a coil of a magnetic pole corresponding to a position of the permanent magnets in accordance with a rotational position of the permanent magnets so that a magnetic field of the permanent magnets is perpendicular to a magnetic field produced by the armature coil. A rotation sensor for detecting the rotational position of the permanent magnets is disposed in the stator, the number of detecting elements of the rotation sensor is proportional to the number of phases of the motor, and in the case of a three-phase brushless DC motor, three detecting elements are required. Inexpensive Hall elements (Hall sensors) or the like are used as the detecting elements of the rotation sensor.

FIG. 3 is a wiring diagram showing a schematic configuration of the motor drive circuit 106 that drives the three-phase brushless DC motor 20. The motor drive circuit 106 is an inverter circuit comprised of six semiconductor switching elements SW1~SW6, and is comprised of a serial connection of the semiconductor switching elements SW1 and SW2 (A-phase), a serial connection of the semiconductor switching elements SW3 and SW4 (B-phase) and a serial connection of the semiconductor switching elements SW5 and SW6 (C-phase). Electric power is supplied to the motor drive circuit 106 from the battery 13. Further, the rotation sensor for detecting electrical angle of the motor 20 is comprised of three detecting elements (Hall elements) H1, H2 and H3, the detecting elements H1~H3 are disposed so that a phase difference between a neutral axis of each phase and each detecting element becomes 60°, and phase current values I1, I2 and I3 of three phases are ON/OFF-controlled in accordance with rises and falls of the detecting elements H1, H2 and H3 that detect the electrical angle of the motor 20.

FIG. 4 shows timings of rises and falls of the detecting elements H1~H3 as the rotation sensor and timings of ON/OFF-control of the switching elements SW1~SW6. As shown in FIG. 4, in the rise of the detecting element H1, the switching element SW1 becomes an ON state, and in the rise of the detecting element H2, the switching element SW1 becomes an OFF state, thus A-phase is excited. The switching element SW4 becomes an ON state from the rise of the detecting element H1 to rotating 60°, and the switching element SW6 becomes an ON state after rotating 60°, thus B-phase and C-phase are excited so as to become reverse polarity each other. In this way, since two phases are excited simultaneously, it is possible to effectively drive the motor 20. In order to reverse the motor 20, just need to reverse the relationship of ON/OFF-control of the switching elements SW1~SW6 corresponding to rises and falls of the detecting elements H1~H3.

In a case that an insulation breakdown occurs in the switching elements SW1~SW6 of such the motor drive circuit 106, there is a problem that an abnormal current flows in the motor 20, the motor 20 burns out and the motor 20 acts as an electromagnetic brake. Therefore, a motor relay that lets motor terminals out of the switching elements is inserted into the motor drive circuit 106.

However, when installing the motor relay, extraneous substances attach to relay contacts, the relay contacts are covered by oxidized coating and have a loose connection, even the motor relay is excited, there is a possibility that a failure that the relay contacts become an open state occurs. Further, in a case that the motor current detection circuit broke down, it is impossible to detect a correct motor current, and a proper current control value cannot be outputted, as a result, an inexpedience that an excessive current flows in the motor and an excessive steering assist torque is supplied, or a necessary current does not flow in the motor and a sufficient steering assist torque cannot be supplied, occurs.

In order to avoid an unexpected situation due to such a failure, an initial diagnosis function is installed into the control unit. In starting an engine, the initial diagnosis function is performed, by forcibly applying the motor current, actions of the motor current detection circuit and the relay contacts of the motor relay are confirmed (for example, Japanese Published Unexamined Patent Application No. H8-91239 A (Patent Document 1)).

In the initial diagnosis function, when an open failure of the relay contacts occurs, since an abnormal status similar to a case that a source fault or a ground fault of the motor circuit occurs, based on the abnormal status occurred, the occurrence of the open failure of the relay contacts is presumed. However, it is often the case that the open failure of the relay contacts lack repeatability, and a failure analysis is accompanied by a difficulty. Further, in the detection of the open failure of the relay contacts, if it is possible to identify which relay caused the open failure, the failure analysis can be more quickly performed. However, in the conventional diagnosis function, it is impossible to identify which relay caused the open failure of the relay contacts.

On the other hand, although a matter that insulting extraneous substances attach to the relay contacts is considered as one of the causes of the open failure of the relay contacts, it is empirically known that in a use status that an inrush current (i.e. a current flowing at a moment that the relay contact is closed) flows and the relay contact is closed, the open failure of the relay contact does not occur, meanwhile, in a use state that a current does not flow at the moment that the relay contact is closed, the open failure of the relay contacts occurs at a constant frequency. It is presumed that this is because in the use status that the inrush current flows and the relay contact is closed, the extraneous substances attached to the relay contacts are removed by the inrush current, whereas, in the use state that the current does not flow at the moment that the relay contact is closed and a current flows in the relay contact which is in a closed status, the extraneous substance removal by current is impossible. Therefore, by removing the extraneous substances attached to the relay contacts by performing an operation that a current flows at the moment that the relay contact is closed, it is possible to expect an effect capable of suppressing the occurrence of the open failure of the relay contact.

As a method or an apparatus for solving such a problem, there is a control apparatus for electric power steering apparatus that is described in Japanese Published Unexamined Patent Application No. 2010-132206 A (Patent Document 2). That is to say, as shown in FIG. 5, the control apparatus of Patent Document 2 detects A-phase motor current by forcibly exciting an A-phase motor relay 42 and a B-phase motor relay 44 and, by simultaneously setting the duty ratio of the PWM signal PS for driving the switching elements of the motor drive circuit 106, to a specified duty ratio for an abnormal diagnosis. Then, the control apparatus determines whether the absolute value of the detected A-phase motor current is equal to or more than a given threshold or not, and determines a relay contact 42a of the A-phase motor relay 42 and a relay contact 44a of the B-phase motor relay 44 are normal or abnormal. In the case of determining that the relay contact is abnormal, repeating only a given determination times of the determination of normal/abnormal, and in the case of determining that the relay contact is abnormal even after performing the determination several times, confirming the abnormal determination and then performing a fail-safe processing.

THE LIST OF PRIOR ART DOCUMENTS

Patent Documents

Patent Document 1: Japanese Published Unexamined Patent Application No. H8-91239 A
Patent Document 2: Japanese Published Unexamined Patent Application No. 2010-132206 A

SUMMARY OF THE INVENTION

Problems to be Solved by the Invention

In normal use conditions of the electric power steering apparatus, although the motor relay could have a capacity to be able to tolerate a short time energizing, due to holding the steering wheel (the handle) and so on, when the steering wheel is held in a status that the motor does not rotate for a long time, a high current flows in the motor relay for a long time. In order to deal with such a situation, although a relay with large capacity must be used, there is a problem of becoming expensive.

Further, there is a problem that a large capacity relay becomes not only expensive but also large-sized. However, it is necessary that the size of a relay that can be installed into the electric power steering apparatus is partially small-sized (compact).

The present invention has been developed in view of the above-described circumstances, and an object of the present invention is to provide an electric power steering apparatus that an inexpensive system configuration becomes possible by no longer having to use an expensive large capacity relay as a motor relay and using an inexpensive small capacity electromagnetic type relay as the motor relay through keeping torque variations at a low level by limiting a continuous energization time of a high current flowing in a relay (the motor relay) connected to winding wires of a brushless DC motor used in the electric power steering apparatus and controlling so as to gradually and moderately decrease the high current flowing in the motor relay, and simultaneously an uncomfortable feeling of the steering is suppressed through a thing that the assist of the electric power steering apparatus gradually decreases.

Furthermore, another object of the present invention is to provide an electric power steering apparatus that an inexpensive system configuration becomes possible by estimating a relay-spring-portion-temperature or a relay-coil-portion-temperature and simultaneously comparing an estimated relay-spring-portion-temperature or an estimated relay-coil-portion-temperature with a given temperature and controlling (decreasing or increasing) a relay current based on a comparison result without using an expensive element such as a semiconductor relay or the like and without causing a cost increases due to the use of an inexpensive electromagnetic type relay.

Means for Solving the Problems

The present invention relates to an electric power steering apparatus for calculating a steering assist command value based on a steering torque and a velocity, generating a PWM signal based on said steering assist command value, PWM-controlling a motor via a motor drive circuit comprised of switching elements, and assist-controlling a steering system that a motor relay is inserted between said motor drive circuit and said motor, the above-described object of the present invention is achieved by that comprising: a steering status detecting section that detects a steering status of a steering wheel, outputs a longtime steering holding signal when detecting that said steering status is a longtime steering holding status, and outputs a normal steering signal when detecting that said steering status is a normal steering status, and a motor current control section that determines a motor current control value for controlling a motor current flowing in said motor relay in accordance with said longtime steering holding signal or said normal steering signal that is outputted from said steering status detecting section.

The above-described object of the present invention is more effectively achieved by that wherein said motor relay is an electromagnetic type motor relay; or wherein said steering status detecting section detects a steering status at a time that a given time elapses from a time of determining that said steering status is a steering holding status as said longtime steering holding status; or wherein when said longtime steering holding signal from said steering status detecting section is inputted into said motor current control section, via said motor current control section, in accordance with said motor current control value corresponding to said longtime steering holding signal, control so as to decrease said motor current to a maximum limit desired value within a motor current decline time based on a given decrease rate, when said normal steering signal from said steering status detecting section is inputted into said motor current control section, via said motor current control section, in accordance with said motor current control value corresponding to said normal steering signal, control so as to increase said motor current that is decreased to said maximum limit desired value and recover; or wherein increase an increase rate in control of said motor current than a normal time; or wherein said motor is a three-phase brushless DC motor.

Further, the present invention relates to an electric power steering apparatus for calculating a steering assist command value based on a steering torque and a velocity, generating a PWM signal based on said steering assist command value, PWM-controlling a motor via a motor drive circuit comprised of switching elements, and assist-controlling a steering system that a motor relay is inserted between said motor drive circuit and said motor, the above-described object of the present invention is achieved by that comprising: a temperature estimating section that estimates a temperature of a relay spring portion or a relay coil portion of said relay, a comparing section that compares an estimated temperature value that is estimated by said temperature estimating section with a given temperature, and a motor current control section that controls a motor current flowing in said motor relay in accordance with a comparison result of said comparing section.

The above-described object of the present invention is more effectively achieved by that wherein said motor is a three-phase brushless DC motor, and said motor relay is an electromagnetic type motor relay; or wherein set a decrease rate in control of said motor current to ½ of a normal time, and set an increase rate in control of said motor current to double of said normal time; or wherein further comprising a substrate temperature sensor that detects a temperature of a substrate that is equipped with said motor relay, and said substrate temperature is inputted into said temperature estimating section; or wherein said temperature estimating section is a relay-spring-portion-temperature estimating section, said relay-spring-portion-temperature estimating section comprises an each-phase current accumulating section that accumulates detected each-phase current values of said motor, a maximum value selecting section that selects a maximum value of accumulated values of said detected each-phase current values, a relay-spring-portion-temperature calculating section that calculates a relay-spring-portion-temperature based on a sum of said maximum value and a relay-coil-portion-temperature estimated-value, and an addition section that adds said substrate temperature and said relay-spring-portion-temperature and outputs said relay-spring-portion-temperature estimated-value; or wherein said temperature estimating section is a relay-coil-portion-temperature estimating section, said relay-coil-portion-temperature estimating section comprises an each-phase current accumulating section that accumulates detected each-phase current values of said motor, a maximum value selecting section that selects a maximum value of accumulated values of said detected each-phase current values, a relay-coil-portion-temperature calculating section that calculates a relay-coil-portion-temperature based on a sum of said maximum value and a relay-spring-portion-temperature estimated-value, and an addition section that adds said substrate temperature and said relay-coil-portion-temperature and outputs said relay-coil-portion-temperature estimated-value.

Effects of the Invention

According to an electric power steering apparatus of the present invention, by limiting a continuous energization time of a high current flowing in a motor relay used in a brushless DC motor mounted on the electric power steering apparatus and controlling so as to gradually decrease the high current flowing in the motor relay, keep torque variations at a low level. In this way, it is possible to no longer have to use an expensive large capacity relay as the motor relay and use an inexpensive small capacity electromagnetic type relay as the motor relay of the electric power steering apparatus, and simultaneously it is possible to suppress an uncomfortable feeling of the steering due to a matter that the assist of the electric power steering apparatus gradually decreases.

Moreover, according to an electric power steering apparatus of the present invention, perform temperature estimation of a relay spring portion or a relay coil portion, when an estimated relay-spring-portion-temperature or an estimated relay-coil-portion-temperature becomes equal to or more than a given temperature that is a threshold, limit so as to decrease the motor current flowing in the motor relay. Further, in the case that the estimated relay-spring-portion-temperature or the estimated relay-coil-portion-temperature declines and becomes less than the given temperature, control so as to increase the motor current and recover. In this way, there is an advantage that it is possible to use an inexpensive small capacity electromagnetic type relay without using a large capacity relay.

BRIEF DESCRIPTION OF THE DRAWINGS

In the accompanying drawings.

MODE FOR CARRYING OUT THE INVENTION

Figure 1:
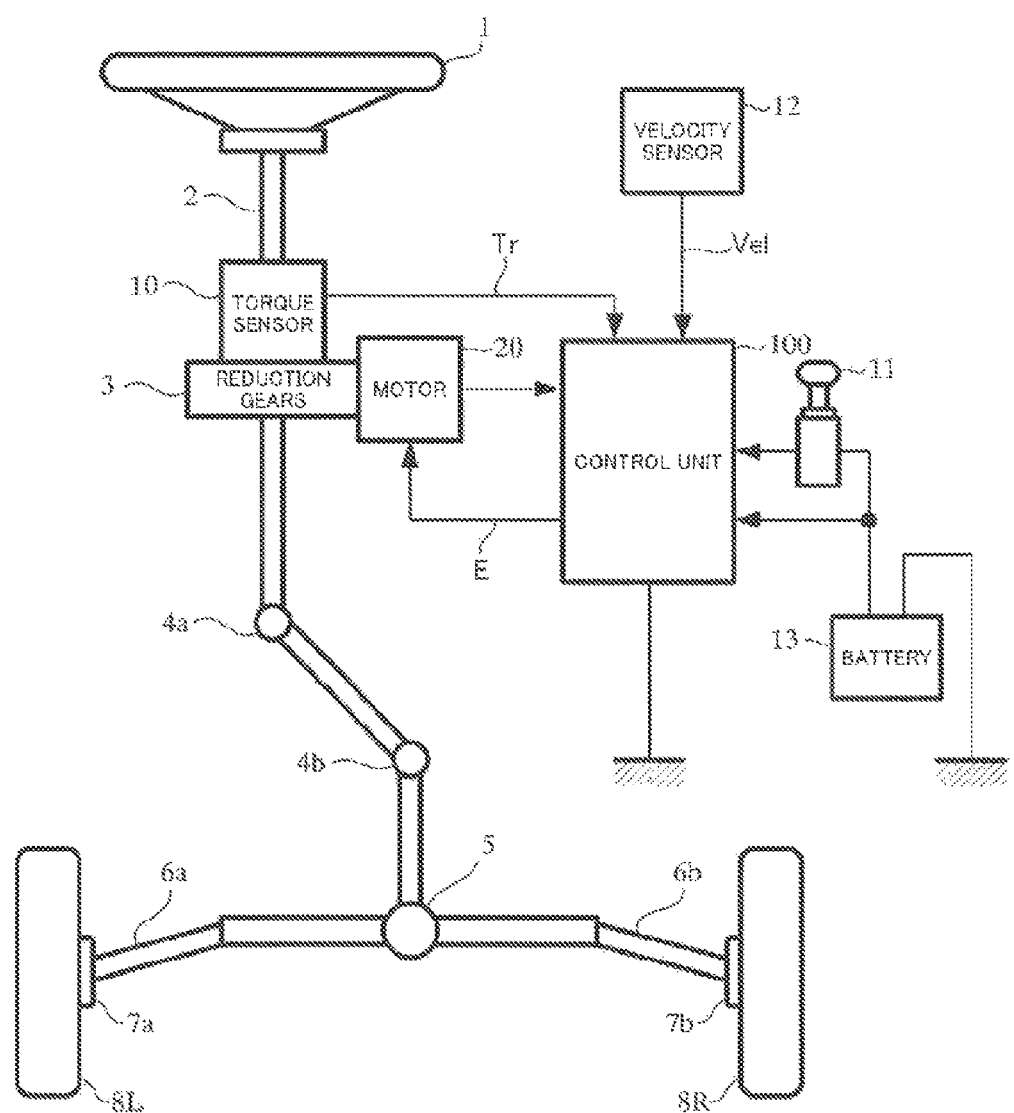
FIG. 1 is a configuration diagram illustrating a schema of a general electric power steering apparatus.
Figure 2:
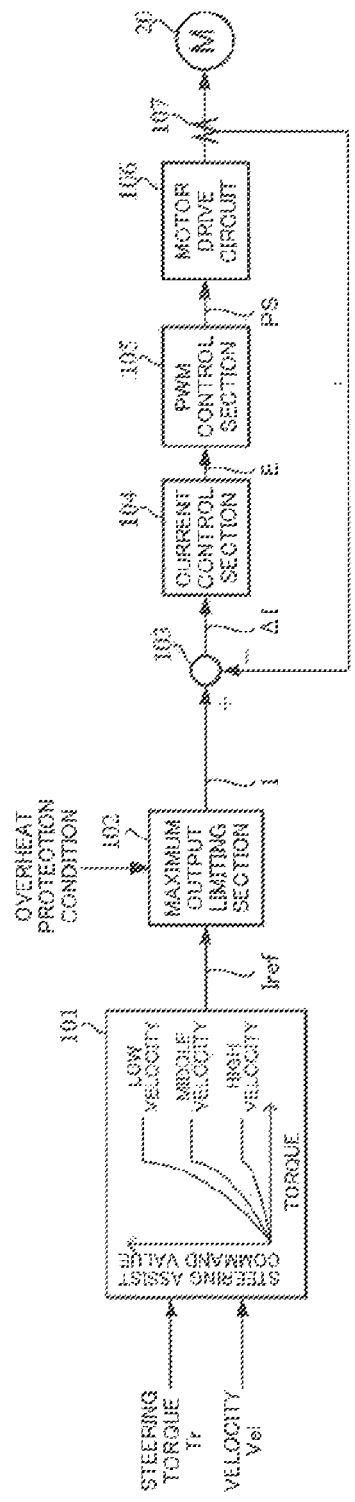
FIG. 2 is a block diagram showing a general configuration example of a control unit.
Figure 3:
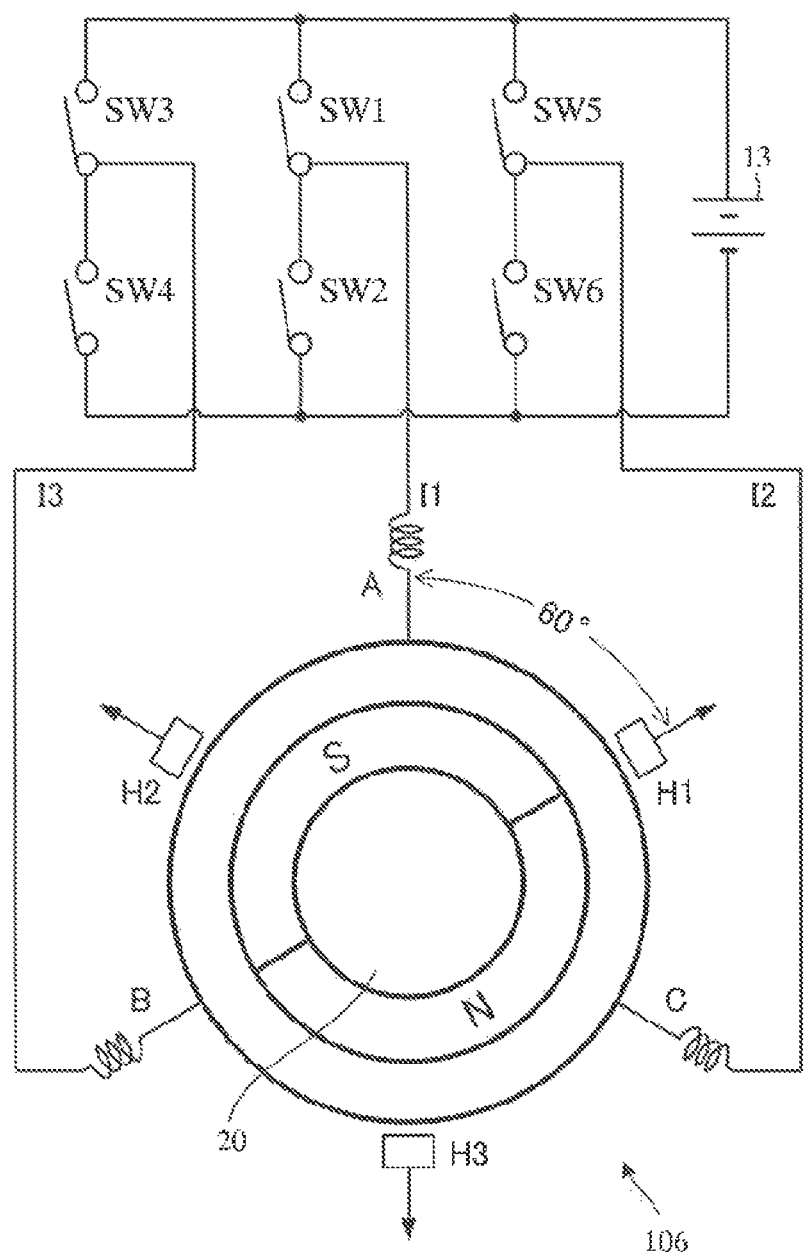
FIG. 3 is a wiring diagram showing a configuration example of a motor drive circuit for driving a three-phase brushless DC motor.
Figure 4:
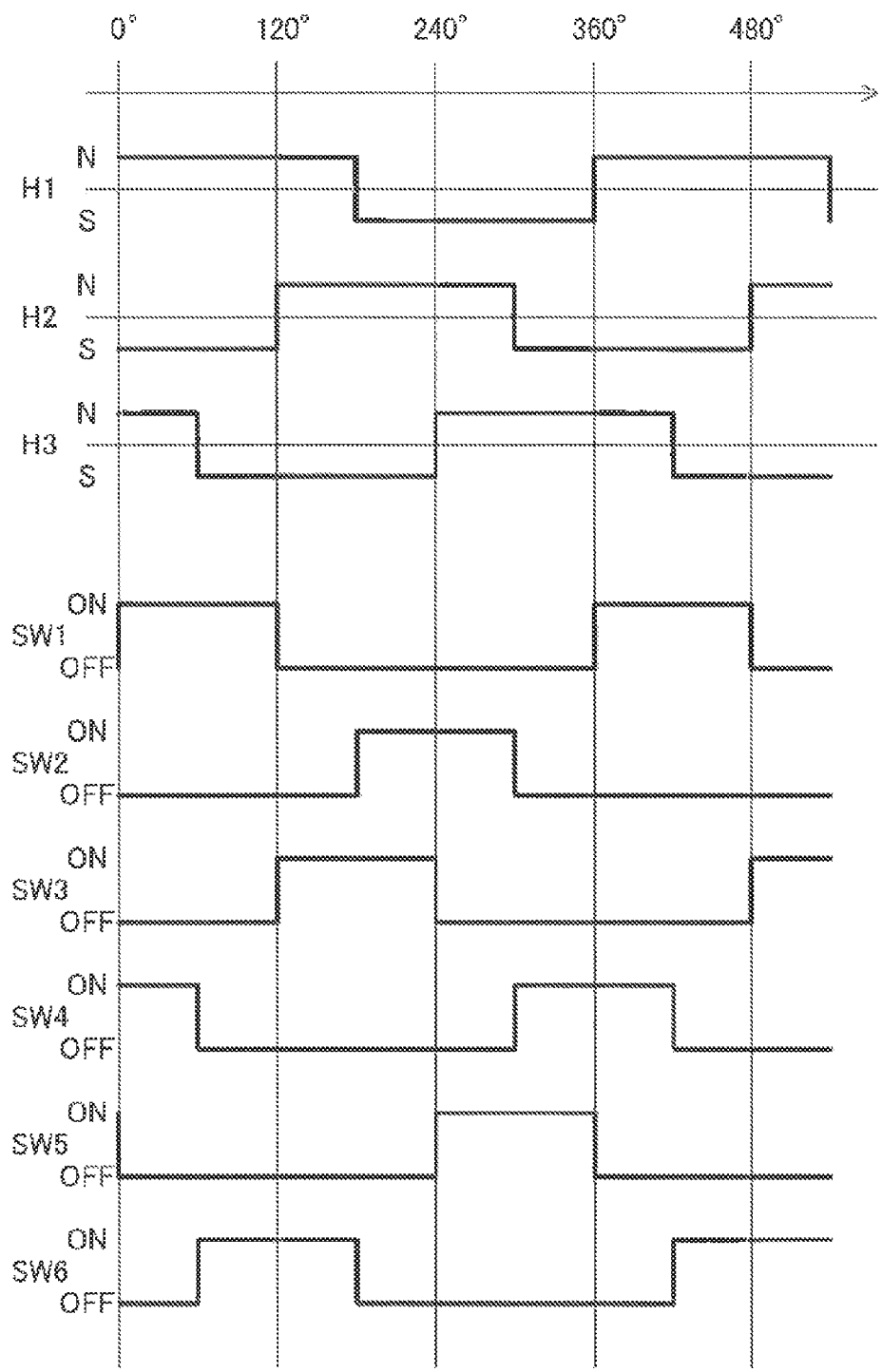
FIG. 4 is a time chart showing operation examples of timings of rises/falls of detecting elements of a rotation sensor and timings of ON/OFF-control of switching elements.

An electric power steering apparatus controls a brushless DC motor providing a steering assist torque by an adjustment of a duty ratio of a PWM (i.e. an energization period (time) ratio of a result obtained by modulating with respect to 100% of pulse width), and a motor drive circuit is comprised of semiconductor switching elements (for example, EFTs) that are ON/OFF-controlled. To ensure that an abnormal current generated by a trouble (failure) of the switching elements does not flow in the motor, a motor relay that lets motor terminals out of the switching elements is inserted into the motor drive circuit.

In normal use conditions, although the motor relay could have a capacity to be able to tolerate a short time energizing, due to holding the handle and so on, when the handle is held in a status that the motor does not rotate for a long time, a high current flows in the motor relay for a long time. In order to deal with such a situation, although a relay with large capacity must be used, there is a problem of becoming expensive and large-sized. Further, semiconductor relays are expensive, and cannot be used in vehicles that cost-cutting is strongly required.

Further, a spring portion of the motor relay has a characteristic that it is easy to overheat and easy to cool down, since a motor current flows in the spring portion, when applying a current, the spring portion immediately becomes a considerable high temperature. Therefore, a high-speed control is required. Further, with respect to contacts of the relay, a place to come into contact with has a large resistance at a point, and suddenly produces heat and becomes equal to or more than 1000° C. Whereas, although only a current of electromagnetic drive flows in a coil portion, the coil portion is affected by heat from the spring portion. And then, since the temperature gradually increases due to large capacity, and also a covering heatproof temperature is not high comparing with the spring, it is a reality that it is very difficult to make both a good balance.

The present invention enables an inexpensive system configuration by estimating a relay-spring-portion-temperature or a relay-coil-portion-temperature by means of a temperature estimating section and simultaneously in the case that an estimated relay-spring-portion-temperature or an estimated relay-coil-portion-temperature becomes equal to or more than each threshold (a given temperature), limiting a relay current without using an expensive switching element such as a semiconductor relay or the like and without causing a cost increases due to the use of a compact and inexpensive electromagnetic type relay. That is, since the relay spring portion or the relay coil portion produces heat when continuously applying a high current to the motor relay, in the present invention, performing temperature estimation of the relay spring portion or the relay coil portion, when the estimated temperature becomes equal to or more than the given temperature, limits (decreases) the current flowing in the motor relay. Further, when the estimated relay-spring-portion-temperature or the estimated relay-coil-portion-temperature becomes less than the given temperature, the present invention controls so as to increase the current flowing in the motor relay. In this way, it is possible to use an inexpensive small capacity electromagnetic type relay as the motor relay.

Hereinafter, embodiments of the present invention will be described in detail with reference to the accompanying drawings.

Figure 6:
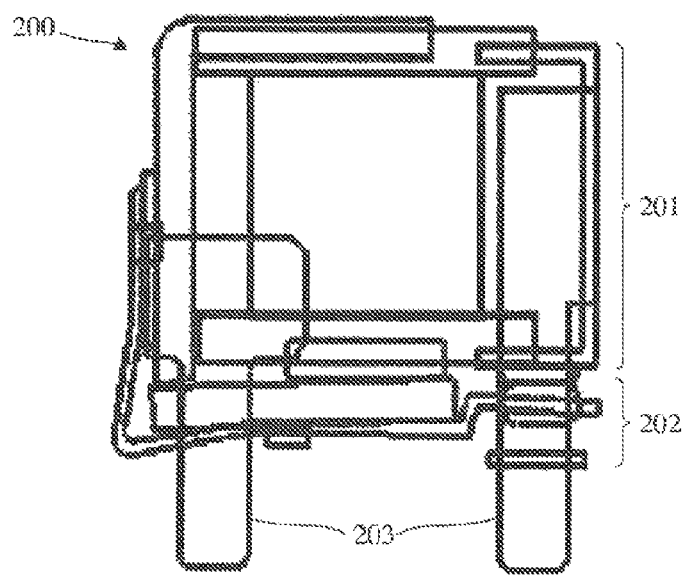
FIG. 6 is a front view showing a construction example of an electromagnetic type relay used in the present invention.

FIG. 6 shows a construction example of a motor relay 200 that is an electromagnetic type relay used in an electric power steering apparatus of the present invention. As shown in FIG. 6, the motor relay 200 comprises a relay coil portion 201 that applies a current to a coil of electromagnetic drive to excite, a relay spring portion 202 that turns contacts 210 and 211ON/OFF in accordance with excitation/non-excitation of the relay coil portion 201 and then performs supply/interception of the current to the motor, and a connector 203 for installation. Further, the motor relay 200 is mounted on a substrate via the connector 203.

Figure 7:
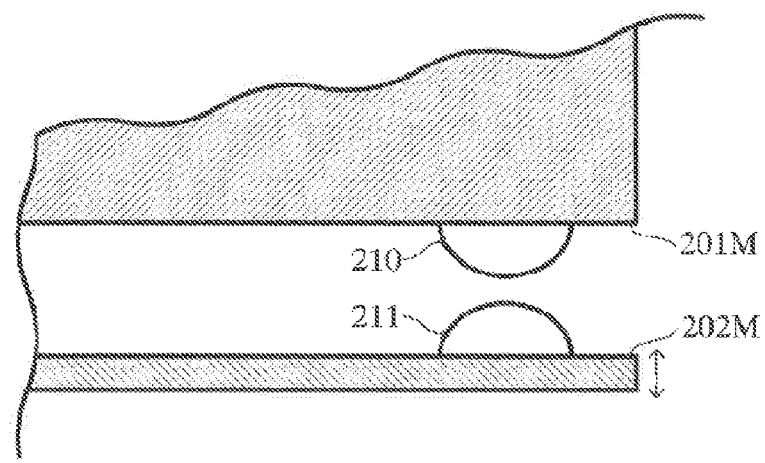
FIG. 7 is a partial sectional construction view showing a construction example of a spring portion of the relay.

The detail of the relay coil portion 201 is shown in FIG. 7. That is, the downside surface of a conduction piece 201M of the relay spring portion 201 is provided with the hemispherical contact 210, a spring piece 202M comprised of an elastic conductive material is disposed on the bottom portion, and the upside surface of the spring piece 202M is provided with the hemispherical contact 211 opposite to the contact 210. In this connection, when a relay current is applied from a coil current control section 110 shown in FIG. 8, the spring piece 202M is sucked in toward the upside of FIG. 7, and a motor current is applied by that the contact 210 comes into contact with the contact 211.

In the meantime, in normal use conditions of the electric power steering apparatus, although the motor relay could have a capacity to be able to tolerate a short time energizing, due to holding the handle and so on, when the handle is held for a long time in a status that the motor does not rotate, a high current flows in the motor relay for a long time. In order to deal with such a situation, although a relay with large capacity must be used, since there is a problem that a large capacity relay becomes expensive and large-sized, a large capacity relay cannot be used in the electric power steering apparatus that cost-cutting is strongly required.

An electric power steering apparatus according to the present invention (the first embodiment) has been developed to deal with such the situation that a high current flows in the motor relay for a long time in the case that the handle is held for a long time in a status that the motor does not rotate (i.e. in a case that a steering holding status continues a certain time or more). The case that the high current flows in the motor relay for a long time, for example, means the following cases (1)-(4).

(1) a case that the driver holds the steering wheel while a finishing turning of the steering and putting his hands on the steering wheel (that is, applying the torque) in the close vicinity of a rack end, in turning around while waiting for a thing that vehicles going straight ahead for a longtime come to an end.

(2) a case that in order to cross railway crossings such as a railway crossing that does not open, a railway crossing with many freight vehicles and so on from a road parallel to a railroad by turning right or left, the driver holds the steering wheel and waits while putting his hands on the steering wheel (that is, applying the torque).

(3) a case that when waiting to turn right at an intersection that becomes the beginning of a precipitous upward slope, the driver holds the steering wheel while putting his hands on the steering wheel (that is, applying the torque) in the close vicinity of a rack end.

(4) a case that the driver drives in a multistory parking garage so as to hold the steering wheel while turning (that is, in running with holding the steering wheel while turning).

The case that the handle is held for a long time in the status that the motor does not rotate (in the present invention, also referred to as "a longtime steering holding status") is different from the assist during a turning steering and mostly does not need the assist. Therefore, the steering is not performed in the above case, i.e. the motor does not work. When a high current is applied only to a certain phase of the motor, a problem that the amount of heat of the motor relay of that certain phase increases arises.

In order to solve such a problem, in the present invention (the first embodiment), in the case of detecting the longtime steering holding status that the steering holding status continues a given time or more (that is, in the case that limiting a continuous energization time of the motor current flowing in the motor relay that becomes a high current due to the steering holding, and the continuous energization time reaches a given limited time determined by the capacity of the motor relay), by controlling so as to gradually decrease the motor current flowing the motor relay, keep torque variations at a low level. In this way, it is possible to enables an inexpensive system configuration without using an expensive large capacity relay and without causing the cost increases due to the use of a cheap small capacity electromagnetic type relay, and further it is possible to suppress a phenomenon that the amount of heat of the motor relay excessively becomes large. Furthermore, it is also possible to suppress the uncomfortable feeling of the steering through a matter that the assist of the electric power steering apparatus gradually decreases.

That is, when becoming the longtime steering holding status that the steering holding status continues the given time or more, the high current continuously flows in the motor relay for a long time, as a result, the amount of heat of the motor relay excessively becomes large. Therefore, in the present invention (the first embodiment), in the case of detecting such a longtime steering holding status, by decreasing the assist so as not to give the driver the uncomfortable feeling of the steering, as a characteristic shown in FIG. 10, controls so as to gradually decrease the motor current flowing the motor relay. In this way, by setting the time of the steering of the handle as a long time and smoothly changing the torque, the uncomfortable feeling of the steering never be caused.

Figure 5:
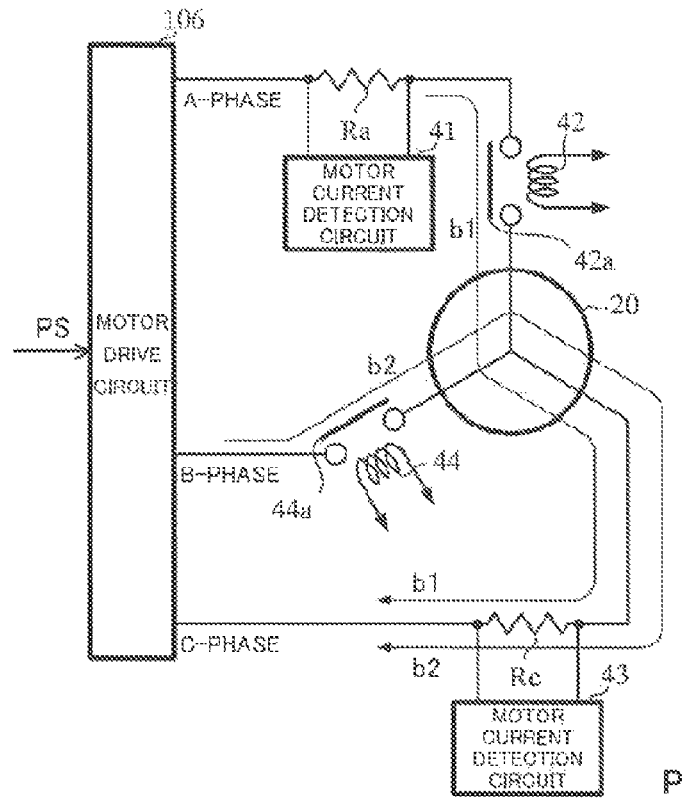
FIG. 5 is a wiring diagram showing an example of a motor drive circuit system.
Figure 8:
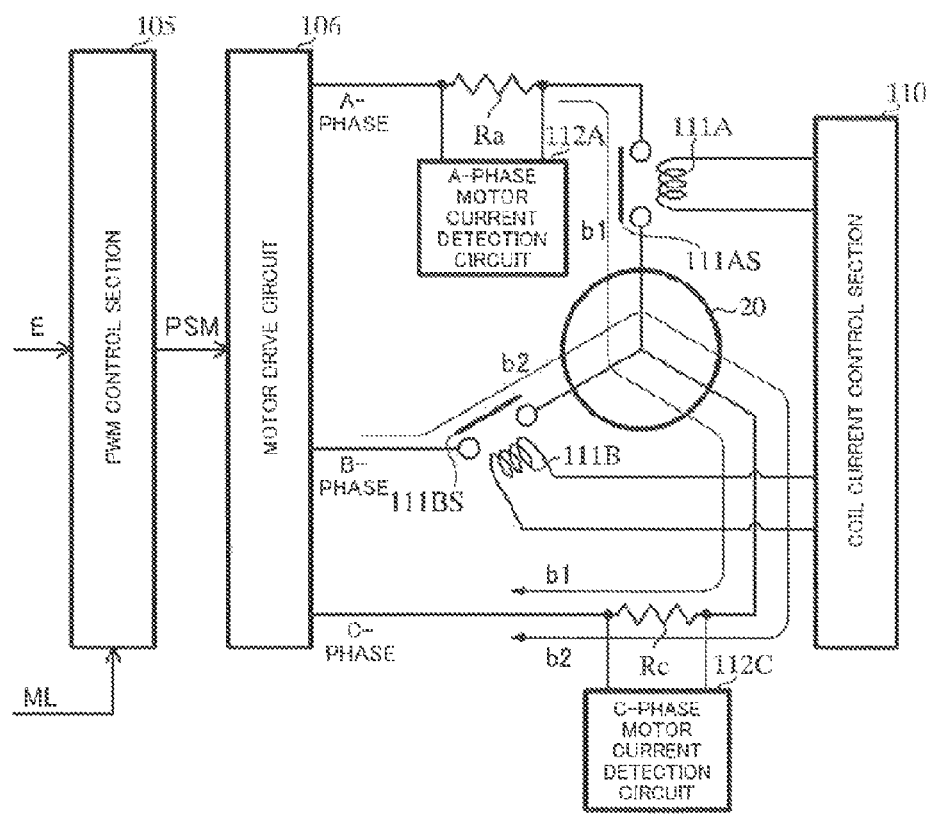
FIG. 8 is a wiring diagram showing an example of a motor drive circuit system according to the present invention (a first embodiment)

FIG. 8 shows a wiring example of a motor drive circuit system according to the present invention (the first embodiment) corresponding to FIG. 5. As shown in FIG. 8, the current control value E from the current control section 104 and a motor current control value ML from a motor current control section 310 that will be described hereinafter are inputted into the PWM control section 105, the PWM control section 105 generates a PWM signal PSM for PWM-controlling the motor 20, and the generated PWM signal PSM is inputted into the motor drive circuit 106.

The point of the first embodiment is a matter that detecting the steering status of the handle by means of the motor current control section 310 that will be described hereinafter, in the case that the detected steering status is a steering holding status, detecting a steering holding status continuing the given time (the given limited time) as the longtime steering holding status, and the apparatus controls so as to gradually decrease the motor current flowing in the motor relay to a maximum limit desired value depending on the motor current control value ML determined based on a longtime steering holding signal LH indicating a matter that the steering status of the handle is the longtime steering holding status, and based on a given decrease rate. Alternatively, the point of the first embodiment is a matter that in the case that the detected steering status is a normal steering status, the apparatus controls so as to quickly increase the motor current that is decreased to the maximum limit desired value and recover depending on the motor current control value ML determined based on a normal steering signal NS indicating a state that the steering status of the handle is the normal steering status.

Figure 9:
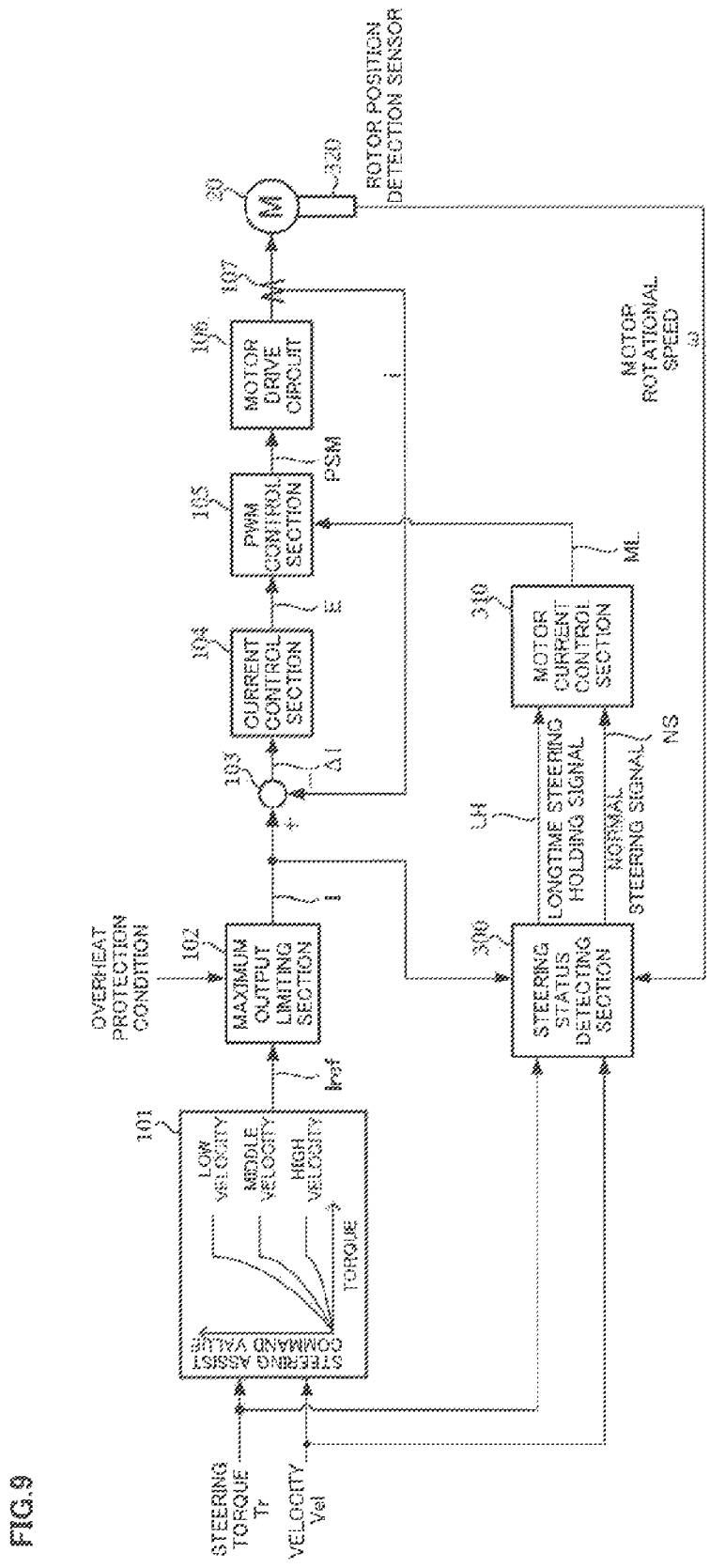
FIG. 9 is a block diagram showing a configuration example of an electric power steering apparatus according to the present invention (the first embodiment)

Further, in the first embodiment, the PWM signal PSM that the duty ratio is controlled by the PWM control section 105, is inputted into the motor drive circuit 106, ON/OFF currents of the A-phase, the B-phase and the C-phase are supplied to the brushless DC motor 20 from the motor drive circuit 106, a motor relay 111A (contact 111AS) is inserted into a power supply line of the A-phase, a motor relay 111B (contact 111BS) is inserted into a power supply line of the B-phase, an A-phase motor current detection circuit 112A is connected to the A-phase via an A-phase resistance Ra, a C-phase motor current detection circuit 112C is connected to the C-phase via a C-phase resistance Rc, and the detected motor currents (the detected A-phase current IA, the detected C-phase current IC, and B-phase current IB detected based on IA+IB+IC=0) are inputted into a subtraction section 103 of FIG. 9 that will be described hereinafter to feed back.

Moreover, in FIG. 8, although the motor relay is inserted into the A-phase and the B-phase, it is also possible to be inserted into other phase combinations. The same applies to the detection of the motor current.

Figure 10:
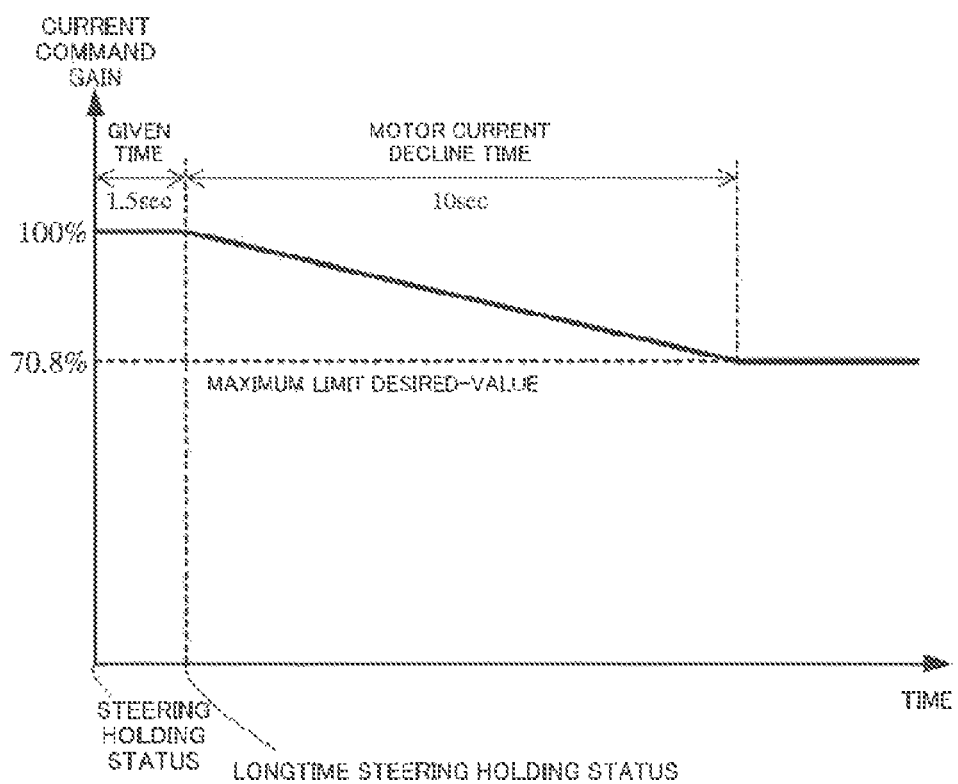
FIG. 10 is a characteristic diagram showing an operation example of the present invention (the first embodiment)
Figure 11:
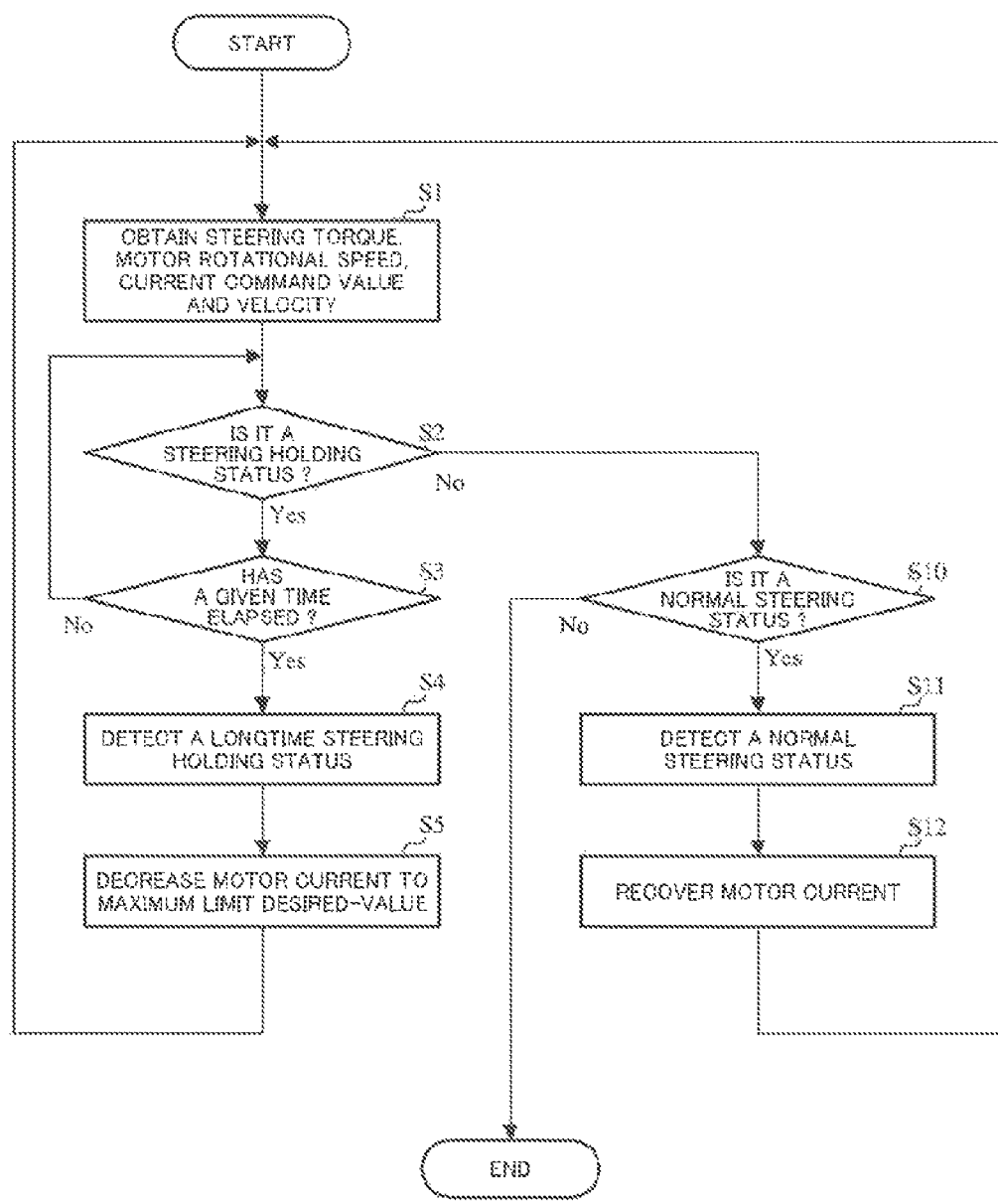
FIG. 11 is apart of a flow chart showing an operation example of the present invention (the first embodiment)

FIG. 9 shows a configuration example of an electric power steering apparatus according to the first embodiment, FIG. 10 is a characteristic diagram showing an operation example of the first embodiment, and FIG. 11 shows a part of a flow chart showing an operation example of the first embodiment. Functions and operations of the electric power steering apparatus according to the first embodiment will be described in detail with reference to FIG. 9, FIG. 10 and FIG. 11.

The electric power steering apparatus of the first embodiment comprises a steering status detecting section 300 and a motor current control section 310. The steering status detecting section 300 detects the steering status of the handle, outputs the longtime steering holding signal LH when detecting that the steering status of the handle is the longtime steering holding status, and outputs the normal steering signal NS when detecting that the steering status of the handle is the normal steering status. The motor current control section 310 determines the motor current control value ML for controlling the motor current flowing in the motor relay in accordance with the longtime steering holding signal LH or the normal steering signal NS that is outputted from the steering status detecting section 300.

In the first embodiment, a steering torque Tr detected by the torque sensor 10 and a velocity Vel from the velocity sensor 12 are inputted into a steering assist command value calculating section 101, and a steering assist command value Iref is calculated by means of an assist map. The calculated steering assist command value Iref is inputted into a maximum output limiting section 102 and an output is limited based on an overheat protection condition or the like in the maximum output limiting section 102. A current command value I that maximum output is limited, is inputted into a subtraction section 103.

The steering torque Tr, the velocity Vel, the current command value I from the maximum output limiting section 102, and a motor rotational speed ω detected by a rotor position detection sensor 320 equipped with the motor 20 are inputted into the steering status detecting section 300 (Step S1 of FIG. 11). The steering status detecting section 300 determines whether the steering status of the handle is the steering holding status or not based on these inputs (Step S2 of FIG. 11), in the case of determining that the steering status is the steering holding status, determines whether a given time has elapsed from the time of determining that the steering status is the steering holding status or not (Step S3 of FIG. 11), in the case of determining that the given time has elapsed, detects a state that the steering status is the longtime steering holding status (Step S4 of FIG. 11), and outputs the longtime steering holding signal LH to the motor current control section 310.

Then, when the longtime steering holding signal LH from the steering status detecting section 300 is inputted into the motor current control section 310, the motor current control value ML corresponding to the longtime steering holding signal LH is inputted into the PWM control section 105 via the motor current control section 310, and the apparatus controls so as to gradually decrease the motor current flowing in the motor relay to the maximum limit desired value based on the given decrease rate (Step S5 of FIG. 11).

On the other hand, the steering status detecting section 300, in the case of determining that the steering status is not the steering holding status (Step S2 of FIG. 11), determines whether the steering status is the normal steering status or not (Step S10 of FIG. 11), in the case of determining that the steering status is the normal steering status, detects a state that the steering status is the normal steering status (Step S11 of FIG. 11), and outputs the normal steering signal NS to the motor current control section 310.

And then, when the normal steering signal NS from the steering status detecting section 300 is inputted into the motor current control section 310, the motor current control value ML corresponding to the normal steering signal NS is inputted into the PWM control section 105 via the motor current control section 310, and the apparatus controls so as to quickly increase the motor current that is decreased to the maximum limit desired-value and recover (Step S12 of FIG. 11).

The first embodiment, for example, detects a state that the steering status is the longtime steering holding status in accordance with the characteristic of FIG. 10, and decreases the motor current to the maximum limit desired-value within a motor current decline time.

Further, in the first embodiment, in order to quickly recover the motor current without causing the uncomfortable feeling of the steering, for example, as shown in the following TABLE 1, it is possible to increase an increase rate of the motor current than a normal time (for example, setting the increase rate of the motor current to a value exceeding 100%/sec). Of course, in recovering the motor current, the increase rate of the motor current can be arbitrarily set. Furthermore, in the first embodiment, in the case of detecting the longtime steering holding status, it is possible to control so as to gradually decrease the motor current for example at a rate that is equal to or less than 10%/sec with respect to a rated maximum current. That is to say, for example, decrease and increase processes of the motor current are performed in accordance with the following TABLE 1. Further, in order to determine the longtime steering holding status, for example, it is possible to set the given time that is a necessary parameter (i.e. a determination continuous time of TABLE 1) to within 5 seconds.

TABLE 1

| functional specification | | configuration |
|---|---|---|
| determination condition | output current | current exceeding at least 80% with respect to rated maximum current (for example, equal to or more than 110A) |
| | motor rotational speed | extreme low speed rotation status corresponding to stop or holding steering (for example, equal to or less than 15 rpm) |
| | velocity | all velocities |
| detection condition | determination continuous time | given time within 5 seconds |
| processing during detection | decrease rate | rate that is equal to or less than 10%/sec with respect to rated maximum current |
| | increase rate | value exceeding 100%/sec |

Next, a second embodiment will be described. The second embodiment performs the temperature estimation of the relay spring portion, when the estimated relay-spring-portion-temperature becomes equal to or more than a given temperature $T_0$, limits (decreases) the current flowing in the motor relay, when the estimated relay-spring-portion-temperature becomes less than the given temperature $T_0$, controls so as to increase the current flowing in the motor relay.

Figure 12:
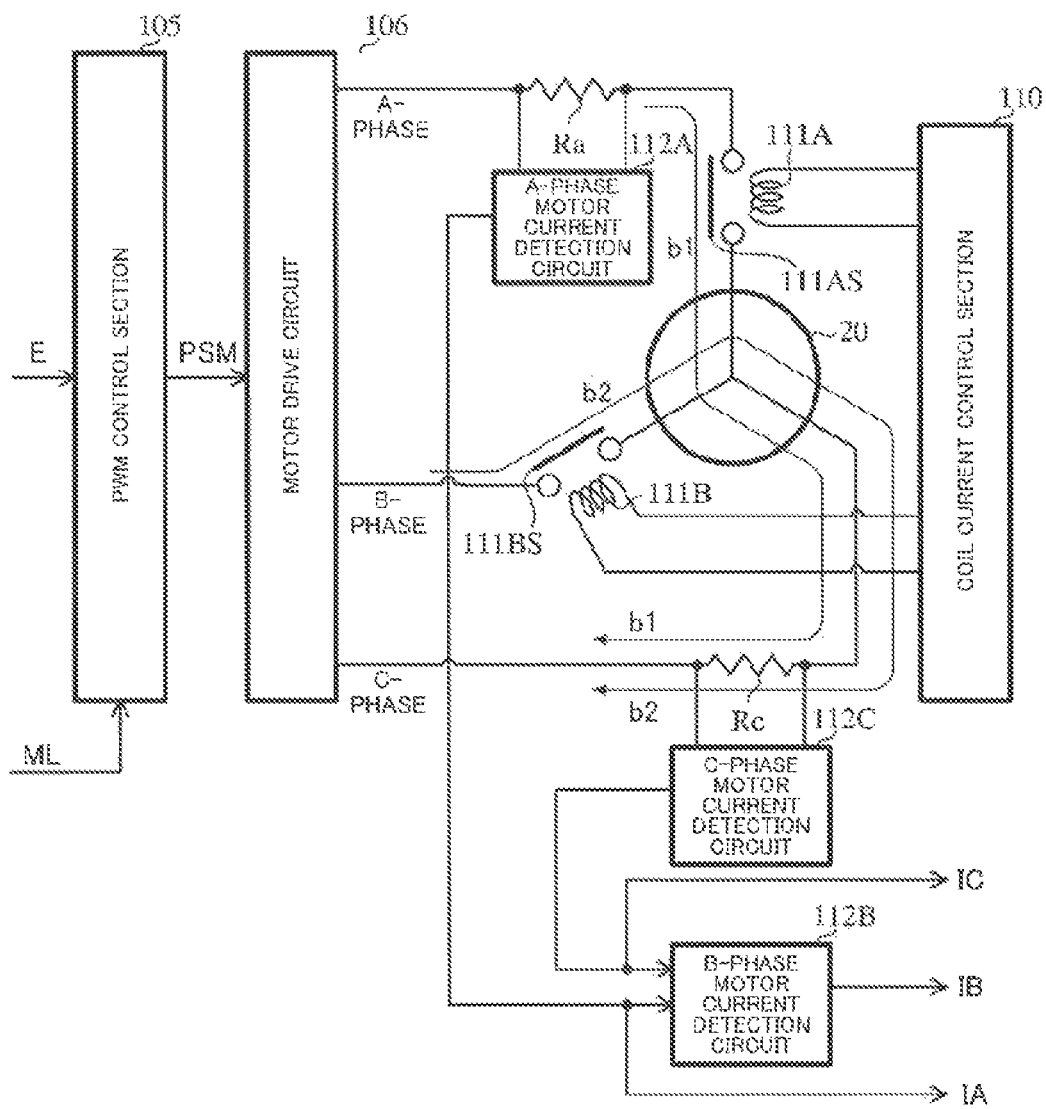
FIG. 12 is a wiring diagram showing an example of a motor drive circuit system according to the present invention (a second embodiment)

FIG. 12 shows a wiring example of a motor drive circuit system according to the second embodiment corresponding to FIG. 8. As shown in FIG. 12, the current control value E is inputted into the PWM control section 105, the PWM control section 105 generates a PWM signal PSM for PWM-controlling the motor 20, and the generated PWM signal PSM is inputted into the motor drive circuit 106. In the second embodiment, since limiting (decreasing) the motor current when a relay-spring-portion-temperature estimated-value RSE becomes equal to or more than the given temperature $T_0$ that is a threshold, or since controlling so as to increase the motor current when the relay-spring-portion-temperature estimated-value RSE declines and becomes less than the given temperature $T_0$, input the motor current control value ML into the PWM control section 105.

The PWM signal PSM that the duty ratio is controlled by the PWM control section 105, is inputted into the motor drive circuit 106, ON/OFF currents of the A-phase, the B-phase and the C-phase are supplied to the brushless DC motor 20 from the motor drive circuit 106, a motor relay 111A is inserted into a power supply line of the A-phase, a motor relay 111B is inserted into a power supply line of the B-phase, an A-phase motor current detection circuit 112A is connected to the A-phase via an A-phase resistance Ra, a C-phase motor current detection circuit 112C is connected to the C-phase via a C-phase resistance Rc, the detected A-phase current IA and the detected C-phase current IC are inputted into a relay-spring-portion-temperature estimating section that will be described hereinafter, and are inputted into a B-phase motor current detection circuit 112B. The B-phase motor current detection circuit 112B detects a B-phase current "IB=−(IA+IC)" based on "IA+IB+IC=0", and the detected B-phase current IB is inputted into the relay-spring-portion-temperature estimating section. Further, excitation currents of the motor relay 111A and the motor relay 111B are ON/OFF-controlled by the coil current control section 110.

Figure 13:
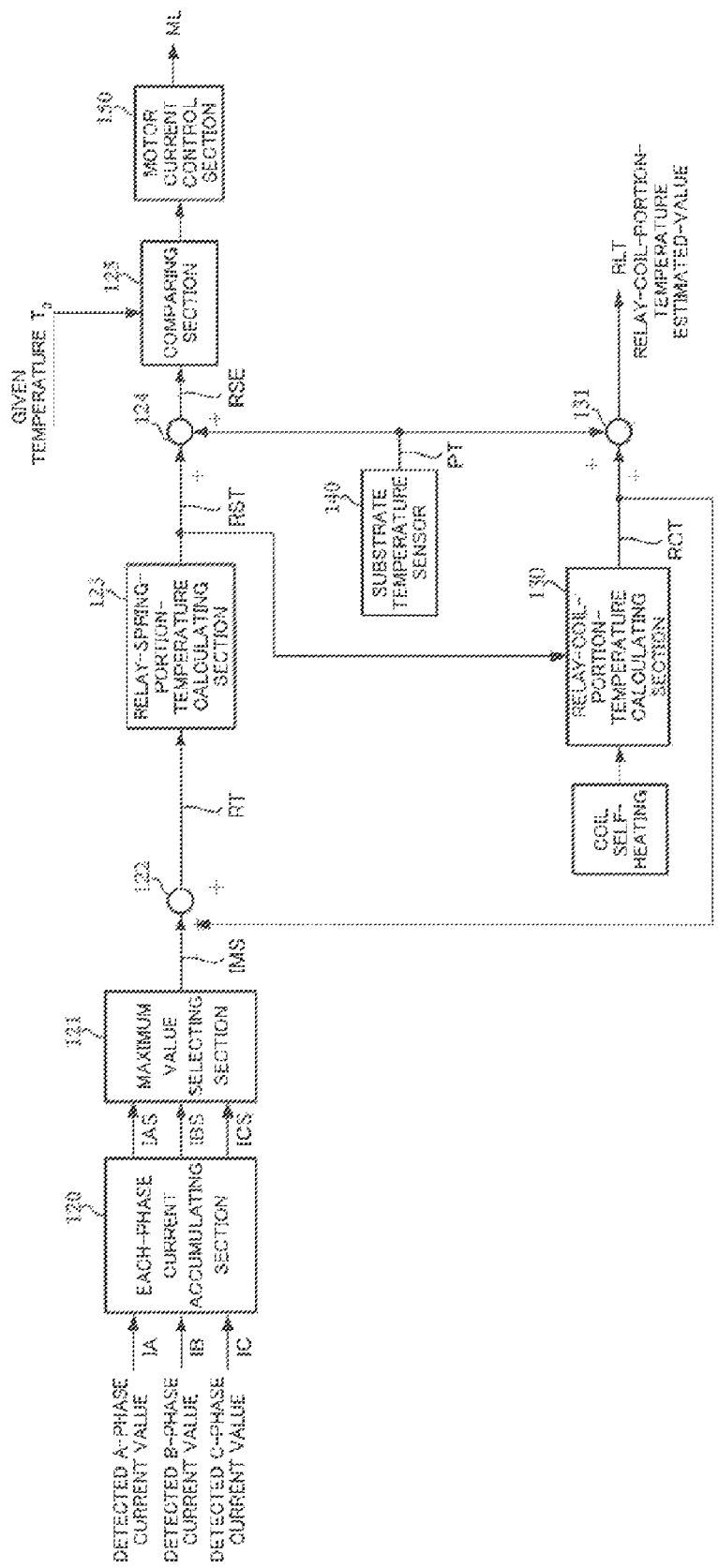
FIG. 13 is a block diagram showing a configuration example of a relay-spring-portion-temperature estimating section according to the present invention (the second embodiment)

FIG. 13 shows a configuration example of the relay-spring-portion-temperature estimating section according to the second embodiment. As shown in FIG. 13, the detected A-phase current value IA, the detected B-phase current value IB and the detected C-phase current IC are inputted into an each-phase current accumulating section 120, an accumulated A-phase current value IAS, an accumulated B-phase current value IBS and an accumulated C-phase current ICS that are accumulated for every phase, are inputted into a maximum value selecting section 121. A maximum value IMS of the accumulated value selected by the maximum value selecting section 121 is inputted into an addition section 122, and a reference temperature RT obtained by an addition performed in the addition section 122 is inputted into a relay-spring-portion-temperature calculating section 123.

Further, a substrate temperature sensor 140 such as a thermistor sensor or the like is equipped with the substrate, a substrate temperature PT detected by the substrate temperature sensor 140 is inputted into addition sections 124 and 131, a temperature RST calculated by the relay-spring-portion-temperature calculating section 123 is added to the substrate temperature PT in the addition section 124, and the relay-spring-portion-temperature estimated-value RSE is obtained. The relay-spring-portion-temperature estimated-value RSE is compared with the given temperature $T_0$ in a comparing section 125, when the estimate relay-spring-portion-temperature value RSE becomes equal to or more than the given temperature $T_0$, via the motor current control section 150, input the motor current command value ML into the PWM control section 105, and limit (decrease) the motor current. Further, when the relay-spring-portion-temperature estimated-value RSE declines and becomes less than the given temperature $T_0$ after the relay-spring-portion-temperature estimated-value RSE becomes equal to or more than the given temperature $T_0$, depending on the motor current control value ML from the motor current control section 150, increase the motor current and recover.

The temperature RST from the relay-spring-portion-temperature calculating section 123 is inputted into a relay-coil-portion-temperature calculating section 130, and the calculated relay-coil-portion-temperature RCT is added to the substrate temperature PT in the addition section 131 and is outputted as a relay-coil-portion-temperature estimated-value RLT, and simultaneously is inputted into the addition section 122.

Figure 14:
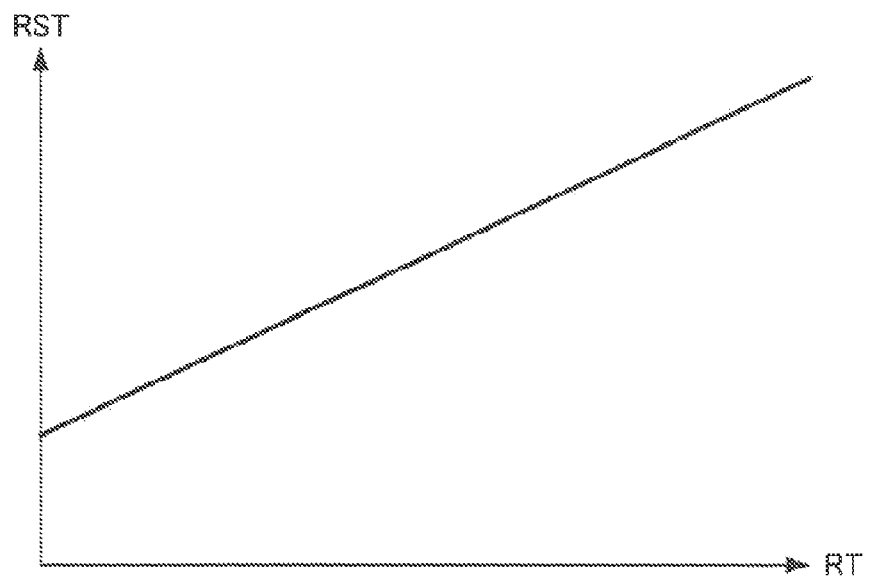
FIG. 14 is a characteristic diagram showing a calculation example of a relay-spring-portion-temperature calculating section.

For example, the relay-spring-portion-temperature calculating section 123 has a characteristic shown in FIG. 14. Further, for example, the relay-coil-portion-temperature calculating section 130 has a characteristic shown in FIG. 15.

Figure 16:
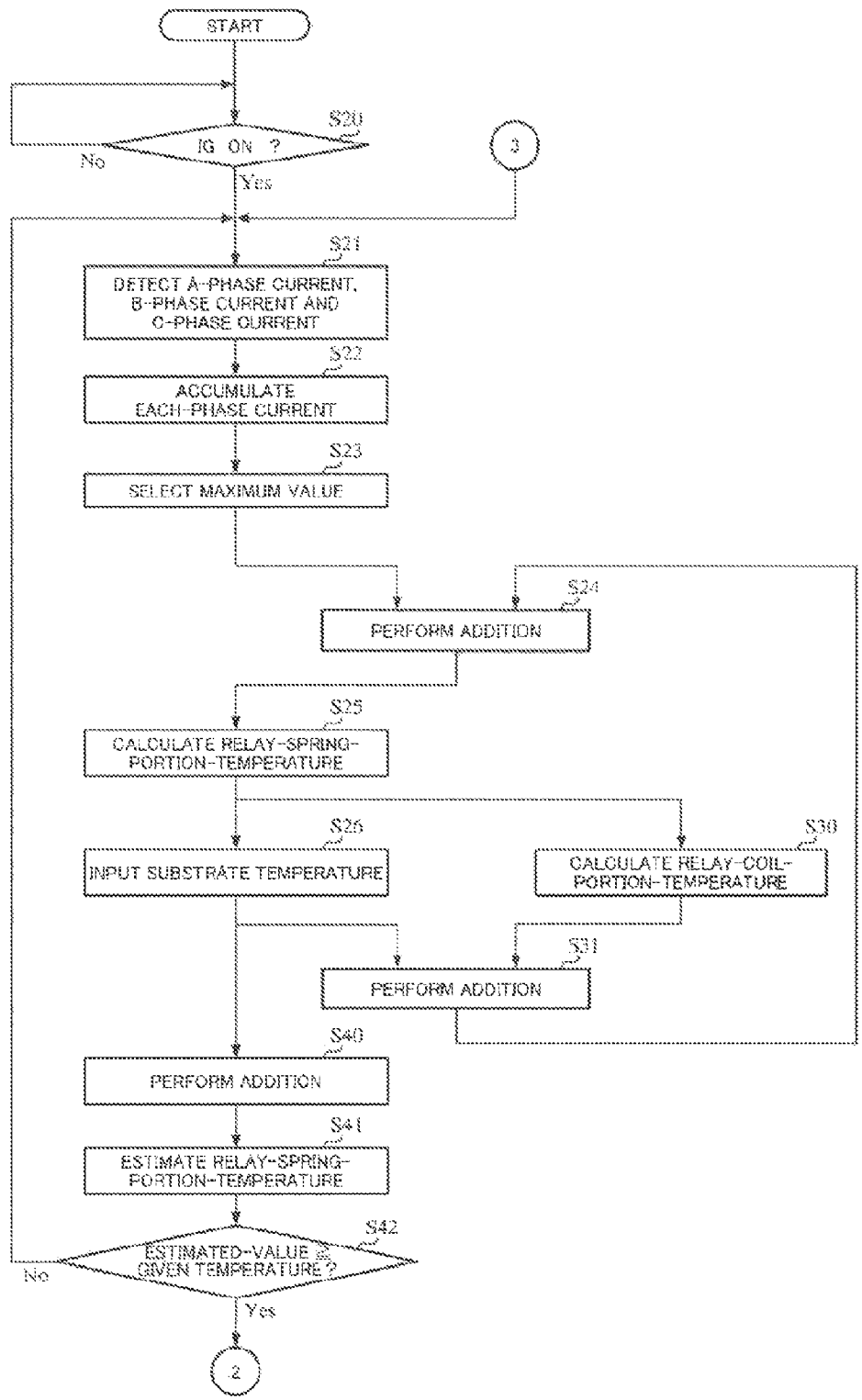
FIG. 16 is apart of a flow chart showing an operation example of the present invention (the second embodiment)
Figure 17:
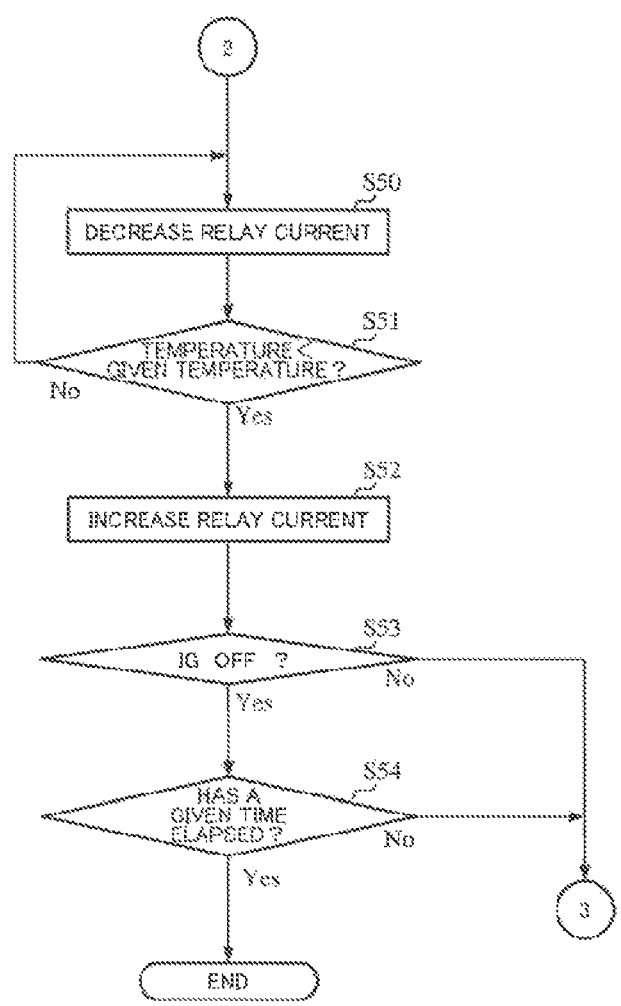
FIG. 17 is a part of a flow chart showing the operation example of the present invention (the second embodiment)

In such a configuration, the operation example will be described with reference to the flow charts of FIG. 16 and FIG. 17.

When the ignition key is turned on (Step S20), although an ordinary diagnosis and assist control are performed, hereinafter, only operations relating to the second embodiment will be described. In the second embodiment, when the ignition key is turned on (Step S20), the A-phase motor current detection circuit 112A, the B-phase motor current detection circuit 112B and the C-phase motor current detection circuit 112C detect each-phase current (A-phase current, B-phase current and C-phase current) and input (Step S21), and the each-phase current accumulating section 120 performs accumulating of the motor current for every phase (Step S22). The accumulated current values IAS, IBS and ICS for each phase are inputted into the maximum value selecting section 121, the maximum value IMS is selected from among the accumulated current values IAS, IBS and ICS by means of the maximum value selecting section 121 (Step S23), the selected maximum value IMS is added to an initial value of the relay-coil-portion-temperature estimated-value RLT in the addition section 122 (Step S24), the reference temperature RT that is a result of the addition performed in the addition section 122, is inputted into the relay-spring-portion-temperature calculating section 123.

The relay-spring-portion-temperature calculating section 123 calculates the relay-spring-portion-temperature RST in accordance with the characteristic of FIG. 14 (Step S25), and the calculated relay-spring-portion-temperature RST is inputted into the addition section 124 and the relay-coil-portion-temperature calculating section 130. The substrate temperature sensor 140 detects the substrate temperature PT and inputs the detected substrate temperature PT into the addition sections 124 and 131 (Step S26), the addition section 124 adds the substrate temperature PT to the relay-spring-portion-temperature RST (Step S40), and the relay-spring-portion-temperature estimated-value RSE obtained by addition is inputted into the comparing section 125 (Step S41). The comparing section 125 compares the given temperature $T_0$ as the threshold with the relay-spring-portion-temperature estimated-value RSE (Step S42), when the relay-spring-portion-temperature estimated-value RSE becomes equal to or more than the given temperature $T_0$, limit (decrease) the motor current by outputting the motor current command value ML from the motor current control section 150 and inputting the motor current control value ML into the PWM control section 105 (Step S50). Although the decrease rate is arbitrary, in this embodiment, set the decrease rate to ½(50%) of a normal current. In the case that the relay-spring-portion-temperature estimated-value RSE is less than the given temperature $T_0$, return to the above-described Step S21 and repeat the above-described operations.

Figure 15:
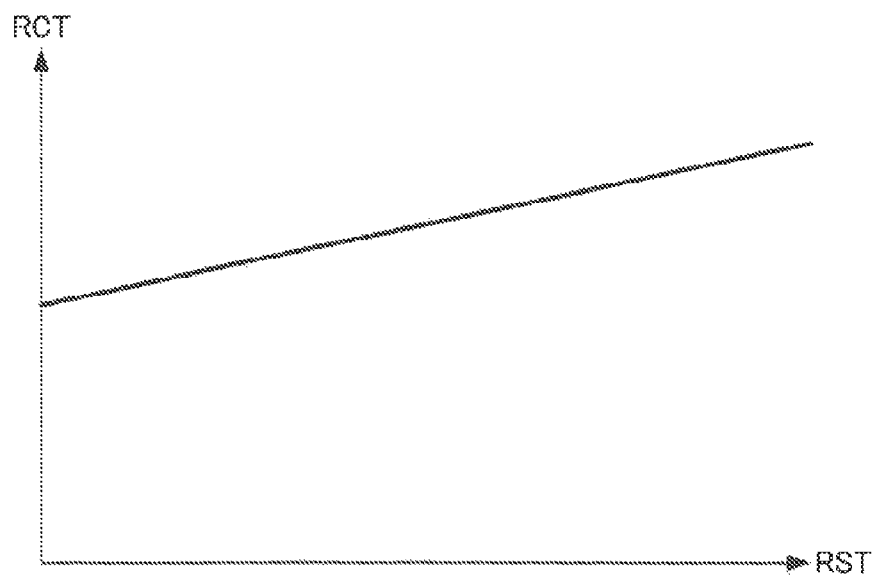
FIG. 15 is a characteristic diagram showing a calculation example of a relay-coil-portion-temperature calculating section.

Further, in the above-described Step S25, when the relay-spring-portion-temperature RST is calculated, the relay-spring-portion-temperature RST is inputted into the relay-coil-portion-temperature calculating section 130, and calculate the relay-coil-portion-temperature RCT in accordance with the characteristic shown in FIG. 15 (Step S30). The relay-coil-portion-temperature RCT is inputted into the addition section 131 and is added to the substrate temperature PT (Step S31), the relay-coil-portion-temperature estimated-value RLT obtained by addition is inputted into the addition section 122 and is added (Step S24).

On the other hand, decrease of the motor current performed in the above-described Step S50, is maintained until the relay-spring-portion-temperature estimated-value RSE becomes less than the given temperature $T_0$ (Step S51), when the relay-spring-portion-temperature estimated-value RSE becomes less than the given temperature $T_0$ due to fall in temperature, the apparatus controls so as to increase the motor current (Step S52). In order to quickly recover the motor current without causing the uncomfortable feeling of the steering, although this embodiment sets the increase rate of the motor current to double (200%), the increase rate of the motor current can be arbitrarily set. For example, decrease and increase processes of the motor current are performed in accordance with the following TABLE 2.

TABLE 2

| functional specification | | relay spring portion overheat protection measure | coil overheat protection measure |
|---|---|---|---|
| determination condition | temperature estimated-value determination | equal to or more than 242° C. | equal to or more than 148° C. |
| detection condition | continuous time | | real time |
| processing during detection | decrease rate | | 50%/sec |
| | increase rate | | 200%/sec |

Then, even the ignition key is turned OFF, return to the above-described Step S21 and repeat the above-described operations until a given time has elapsed. The given time is a time for temperatures of the substrate temperature sensor and the relay spring portion to become constantly stable.

Further, it is also possible to record a temperature information in an EEPROM, start calculations from the recorded information, and in the case of the temperature estimation in recovering from failures, calculate the initial value from a predetermined temperature so as not to pose impediments even power-supply variations due to sudden battery change and failures of other portions arise and the CPU stops (reset). This is to avoid a matter that in the case that failure arises when the temperature is high, when start from a place having a low estimated-value and apply a high current, destroy the relay, or by starting from a place having a high estimated e-value and unnecessarily performing current limitation, necessary assist torque does not come out for a while (the handle is heavy).

Next, a third embodiment will be described. The third embodiment performs the temperature estimation of the relay coil portion, when the estimated relay-coil-portion-temperature becomes equal to or more than a given temperature $T_1$, limits (decreases) the current flowing in the motor relay, when the estimated relay-coil-portion-temperature becomes less than the given temperature $T_1$, controls so as to increase the current flowing in the motor relay.

A wiring example of a motor drive circuit system according to the third embodiment is really the same as FIG. 12 of the second embodiment, the current control value E is inputted into the PWM control section 105, the PWM control section 105 generates a PWM signal PSM for PWM-controlling the motor 20, and the generated PWM signal PSM is inputted into the motor drive circuit 106. In the third embodiment, since limiting (decreasing) the motor current when a relay-coil-portion-temperature estimated-value RLT becomes equal to or more than the given temperature $T_1$ that is a threshold, or since controlling so as to increase the motor current when the relay-coil-portion-temperature estimated-value RLT declines and becomes less than the given temperature $T_1$, input the motor current control value ML into the PWM control section 105.

Further, exactly as with the second embodiment, the PWM signal PSM that the duty ratio is controlled by the PWM control section 105, is inputted into the motor drive circuit 106, ON/OFF currents of the A-phase, the B-phase, and the C-phase are supplied to the brushless DC motor 20 from the motor drive circuit 106, a motor relay 111A is inserted into a power supply line of the A-phase, a motor relay 111B is inserted into a power supply line of the B-phase, an A-phase motor current detection circuit 112A is connected to the A-phase via an A-phase resistance Ra, a C-phase motor current detection circuit 112C is connected to the C-phase via a C-phase resistance Rc, the detected A-phase current IA and the detected C-phase current IC are inputted into a relay-coil-portion-temperature estimating section that will be described hereinafter, and simultaneously are inputted into a B-phase motor current detection circuit 112B. Further, excitation currents of the motor relay 111A and the motor relay 111B are ON/OFF-controlled by the coil current control section 110.

Figure 18:
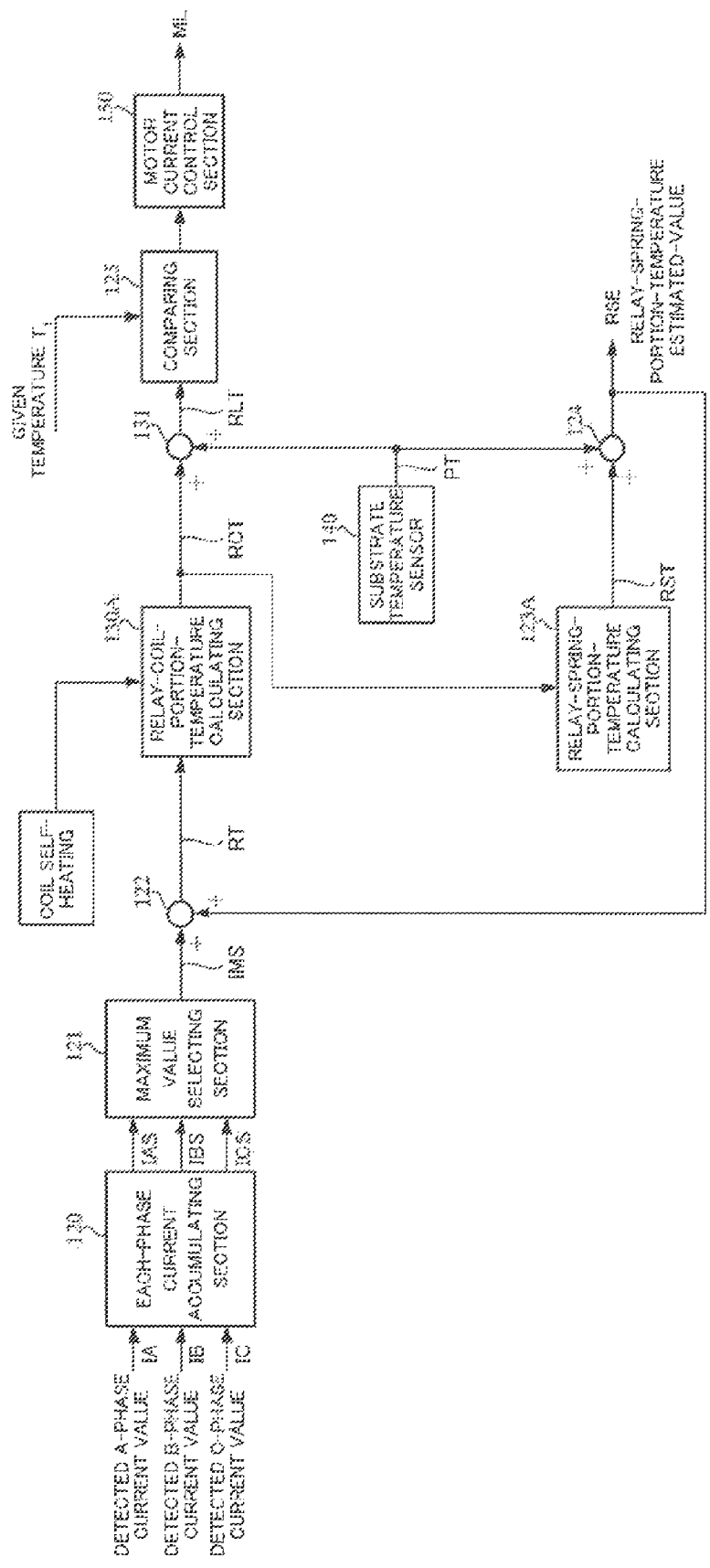
FIG. 18 is a block diagram showing a configuration example of a relay-coil-portion-temperature estimating section according to the present invention (a third embodiment)

FIG. 18 shows a configuration example of the relay-coil-portion-temperature estimating section according to the third embodiment. As shown in FIG. 18, the detected A-phase current value IA, the detected B-phase current value IB and the detected C-phase current IC are inputted into an each-phase current accumulating section 120, an accumulated A-phase current value IAS, an accumulated B-phase current value IBS and an accumulated C-phase current ICS that are accumulated for every phase, are inputted into a maximum value selecting section 121. A maximum value IMS of the accumulated value selected by the maximum value selecting section 121 is inputted into an addition section 122, and a reference temperature RT obtained by an addition performed in the addition section 122 is inputted into a relay-coil-portion-temperature calculating section 130.

Further, a substrate temperature sensor 140 such as a thermistor sensor or the like is equipped with the substrate, a substrate temperature PT detected by the substrate temperature sensor 140 is inputted into addition sections 124 and 131, a temperature RCT calculated by the relay-coil-portion-temperature calculating section 130A is added to the substrate temperature PT in the addition section 131, and the relay-coil-portion-temperature estimated-value RLT is obtained. The relay-coil-portion-temperature estimated-value RLT is compared with the given temperature $T_1$ in a comparing section 125, when the relay-coil-portion-temperature estimated-value RLT becomes equal to or more than the given temperature $T_1$, via the motor current control section 150, input the motor current control value ML into the PWM control section 105, and limit (decrease) the motor current. Furthermore, when the relay-coil-portion-temperature estimated-value RLT declines and becomes less than the given temperature $T_1$ after the relay-coil-portion-temperature estimated-value RLT becomes equal to or more than the given temperature $T_1$, depending on the motor current control value ML from the motor current control section 150, increase the motor current and recover.

The temperature RCT from the relay-coil-portion-temperature calculating section 130A is inputted into a relay-spring-portion-temperature calculating section 123A, and the calculated relay-spring-portion-temperature RST is added to the substrate temperature PT in the addition section 124 and is outputted as a relay-spring-portion-temperature estimated-value RSE, and simultaneously is inputted into the addition section 122.

Figure 19:
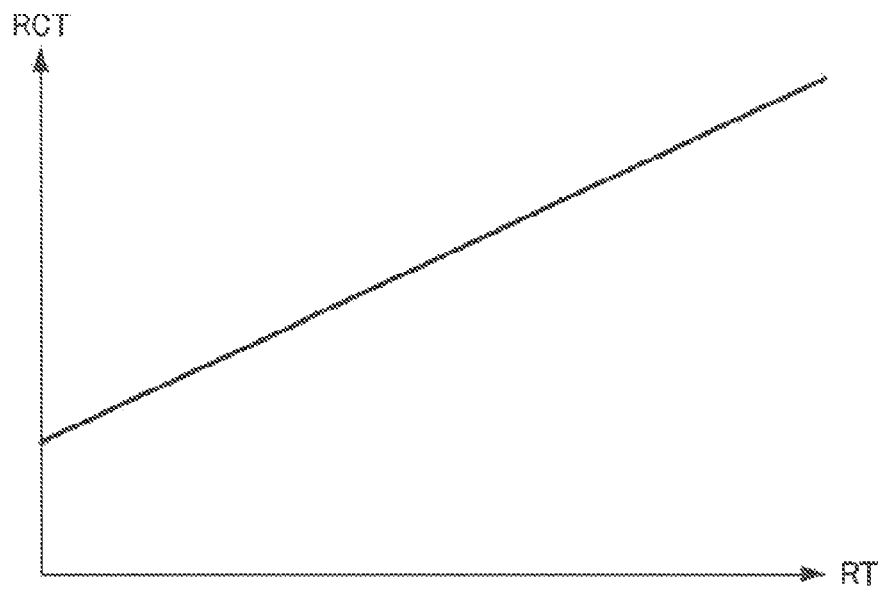
FIG. 19 is a characteristic diagram showing a calculation example of a relay-coil-portion-temperature calculating section.

For example, the relay-coil-portion-temperature calculating section 130A has a characteristic shown in FIG. 19. Further, for example, the relay-spring-portion-temperature calculating section 123A has a characteristic shown in FIG. 20.

Figure 21:
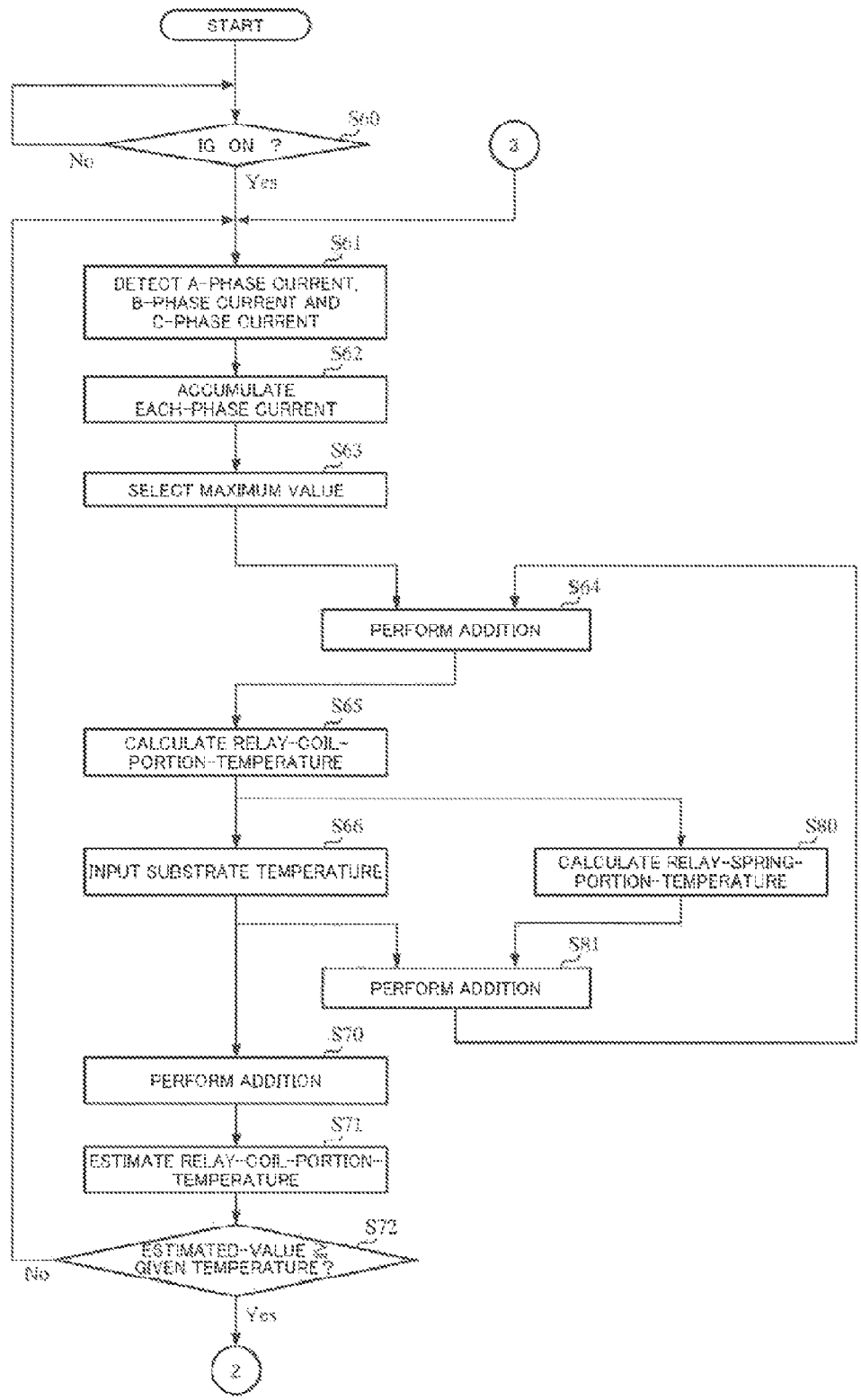
FIG. 21 is apart of a flow chart showing an operation example of the present invention (the third embodiment)
Figure 22:
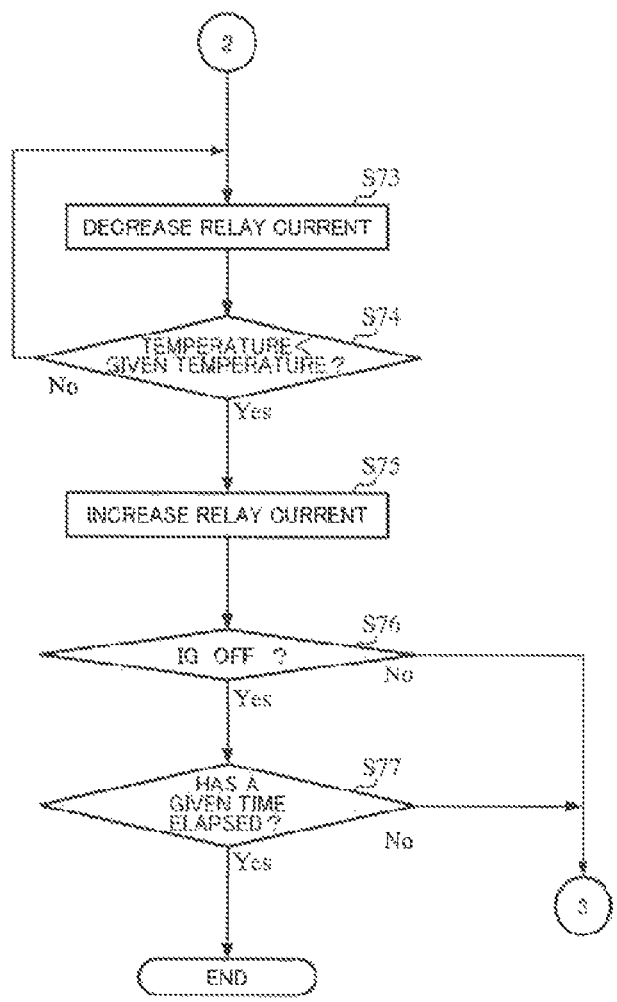
FIG. 22 is a part of a flow chart showing the operation example of the present invention (the third embodiment).

In such a configuration, the operation example will be described with reference to the flow charts of FIG. 21 and FIG. 22.

When the ignition key is turned on (Step S60), although an ordinary diagnosis and assist control are performed, hereinafter, only operations relating to the third embodiment will be described. In the third embodiment, when the ignition key is turned on (Step S60), an A-phase motor current detection circuit 112A, a B-phase motor current detection circuit 112B and a C-phase motor current detection circuit 112C detect each-phase current (A-phase current, B-phase current and C-phase current) and input (Step S61), and the each-phase current accumulating section 120 performs accumulating of the motor current for every phase (Step S62). The accumulated current values IAS, IBS and ICS for each phase are inputted into the maximum value selecting section 121, the maximum value IMS is selected from among the accumulated current values IAS, IBS and ICS by means of the maximum value selecting section 121 (Step S63), the selected maximum value IMS is added to an initial value of the relay-spring-portion-temperature estimated-value RSE in the addition section 122 (Step S64), the reference temperature RT that is a result of the addition performed in the addition section 122, is inputted into the relay-coil-portion-temperature calculating section 130A.

The relay-coil-portion-temperature calculating section 130A calculates the relay-coil-portion-temperature RCT in accordance with the characteristic of FIG. 19 (Step S65), and the calculated relay-coil-portion-temperature RCT is inputted into the addition section 131 and the relay-spring-portion-temperature calculating section 123A. The substrate temperature sensor 140 detects the substrate temperature PT and inputs the detected substrate temperature PT into the addition sections 124 and 131 (Step S66), the addition section 131 adds the substrate temperature PT to the relay-coil-portion-temperature RCT (Step S70), and the relay-coil-portion-temperature estimated-value RLT obtained by addition is inputted into the comparing section 125 (Step S71). The comparing section 125 compares the given temperature $T_1$ as the threshold with the relay-coil-portion-temperature estimated-value RLT (Step S72), when the relay-coil-portion-temperature estimated-value RLT becomes equal to or more than the given temperature $T_1$, limit (decrease) the motor current by outputting the motor current control value ML from the motor current control section 150 and inputting the motor current control value ML into the PWM control section 105 (Step S73). Although the decrease rate is arbitrary, in this embodiment, set the decrease rate to ½(50%) of a normal current. In the case that the relay-coil-portion-temperature estimated-value RLT is less than the given temperature $T_1$, return to the above-described Step S61 and repeat the above-described operations.

Figure 20:
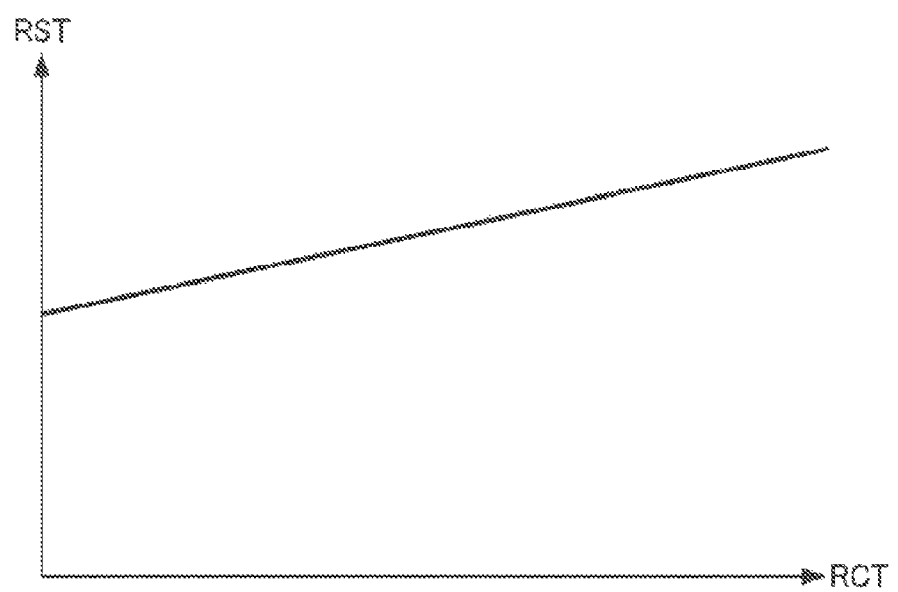
FIG. 20 is a characteristic diagram showing a calculation example of a relay-spring-portion-temperature calculating section.

Further, in the above-described Step S65, when the relay-coil-portion-temperature RCT is calculated, the relay-coil-portion-temperature RCT is inputted into the relay-spring-portion-temperature calculating section 123A, and calculate the relay-spring-portion-temperature RST in accordance with the characteristic shown in FIG. 20 (Step S80). The relay-spring-portion-temperature RST is inputted into the addition section 124 and is added to the substrate temperature PT (Step S81), the relay-spring-portion-temperature estimated-value RSE obtained by addition is inputted into the addition section 122 and is added (Step S64).

On the other hand, decrease of the motor current performed in the above-described Step S73, is maintained until the relay-coil-portion-temperature estimated-value RLT becomes less than the given temperature $T_1$ (Step S74), when the estimate relay-coil-portion-temperature value RLT becomes less than the given temperature $T_1$ due to fall in temperature, the apparatus controls so as to increase the motor current (Step S75). In order to quickly recover the motor current, although this embodiment sets the increase rate of the motor current to double (200%), the increase rate of the motor current can be arbitrarily set. For example, decrease and increase processes of the motor current are performed in accordance with the above-described TABLE 2.

Then, even the ignition key is turned OFF, return to the above-described Step S61 and repeat the above-described operations until a given time has elapsed. The given time is a time for temperatures of the substrate temperature sensor and the relay spring portion to become constantly stable.

Further, it is also possible to record a temperature information in an EEPROM, start calculations from the recorded information, and in the case of the temperature estimation in recovering from failures, calculate the initial value from a predetermined temperature so as not to pose impediments even power-supply variations due to sudden battery change and failures of other portions arise and the CPU stops (reset). This is to avoid a matter that in the case that failure arises when the temperature is high, when start from a place having a low estimated-value and apply a high current, destroy the relay, or by starting from a place having a high estimated-value and unnecessarily performing current limitation, necessary assist torque does not come out for a while (the handle is heavy).

Moreover, although in the above-described embodiments, a three-phase brushless DC motor is described, in the same way, it is possible to apply the present invention to a brushless DC motor having a different number of phases.

EXPLANATION OF REFERENCE NUMERALS 1 handle (steering wheel)
10 torque sensor
12 velocity sensor
13 battery
20 motor (brushless DC motor)
100 control unit
101 steering assist command value calculating section
102 maximum output limiting section
104 current control section
105 PWM control section
106 motor drive circuit
107 motor current detection circuit
110 coil current control section
111A, 111B motor relay
112A A-phase motor current detection circuit
112C C-phase motor current detection circuit
120 each-phase current accumulating section
121 maximum value selecting section
123, 123A relay-spring-portion-temperature calculating section
130, 130A relay-coil-portion-temperature calculating section
140 substrate temperature sensor
150, 310 motor current control section
200 electromagnetic type relay (motor relay)
201 relay coil portion
202 relay spring portion
203 connector
210, 211 contact
300 steering status detecting section
320 rotor position detection sensor

The invention claimed is:

1. An electric power steering apparatus for calculating a steering assist command value based on a steering torque and a velocity, generating a pulse-width modulation (PWM) signal based on said steering assist command value, PWM-controlling a three-phase brushless DC motor via a motor drive circuit comprised of switching elements, and assist-controlling a steering system that an electromagnetic type motor relay is inserted between said motor drive circuit and said three-phase brushless DC motor, comprising:

a temperature estimating section that estimates a temperature of a relay spring portion or a relay coil portion of said electromagnetic type motor relay, a comparing section that compares an estimated temperature value that is estimated by said temperature estimating section with a given temperature, and a motor current control section that controls a motor current flowing in said electromagnetic type motor relay in accordance with a comparison result of said comparing section; and a substrate temperature sensor that detects a temperature of a substrate that is equipped with said electromagnetic type motor relay;

wherein said substrate temperature is inputted into said temperature estimating section, wherein said temperature estimating section is a relay-spring-portion-temperature estimating section, said relay-spring-portion-temperature estimating section comprises:

an each-phase current accumulating section that accumulates detected each-phase current values of said three-phase brushless DC motor, a maximum value selecting section that selects a maximum value of accumulated values of said detected each-phase current values, a relay-spring-portion-temperature calculating section that calculates a relay-spring-portion-temperature based on a sum of said maximum value and a relay-coil-portion-temperature estimated-value, and an addition section that adds said substrate temperature and said relay-spring-portion-temperature and outputs said relay-spring-portion-temperature estimated-value.

2. An electric power steering apparatus according to claim 1, wherein a decrease rate in control of said motor current is set to ½ of a normal time, and an increase rate in control of said motor current is set to double of said normal time.

3. The electric power steering apparatus according to claim 1, further comprising a processor, which includes the temperature estimation section, the comparing section, and the motor current control section.

4. An electric power steering apparatus for calculating steering assist command value based on a steering torque and a velocity, generating a pulse-width modulation (PWM) signal based on said steering assist command value, PWM-controlling a three-phase brushless DC motor via a motor drive circuit comprised of switching elements, and assist-controlling a steering system that an electromagnetic type motor relay is inserted between said motor drive circuit and said three-phase brushless DC motor, comprising:

a temperature estimating section that estimates a temperature of a relay spring portion or a relay coil portion of said electromagnetic type motor relay;

a comparing section that compares an estimated temperature value that is estimated by said temperature estimating section with a given temperature;

a motor current control section that controls a motor current flowing in said electromagnetic type motor relay in accordance with a comparison result of said comparing section; and a substrate temperature sensor that detects a temperature of a substrate that is equipped with said electromagnetic type motor relay;

wherein said substrate temperature is inputted into said temperature estimating section, wherein said temperature estimating section is a relay-coil-portion-temperature estimating section, said relay-coil-portion-temperature estimating section comprises:
    an each-phase current accumulating section that accumulates detected each-phase current values of said three-phase brushless DC motor,
    a maximum value selecting section that selects a maximum value of accumulated values of said detected each-phase current values,
    a relay-coil-portion-temperature calculating section that calculates a relay-coil-portion-temperature based on a sum of said maximum value and a relay-coil-portion-temperature estimated-value, and
    an addition section that adds said substrate temperature and said relay-coil-portion-temperature and outputs said relay-spring-coil-portion-temperature estimated-value.

5. An electric power steering apparatus according to claim 4, wherein a decrease rate in control of said motor current is set to ½ of a normal time and an increase rate in control of said motor current is set to double of said normal time.

6. The electric power steering apparatus according to claim 4, further comprising a processor, which includes the temperature estimation section, the comparing section, and the motor current control section.

7. An electric power steering apparatus comprising:
a memory storing executable instructions; and
a processor configured to execute the stored instructions comprising:
estimating a temperature of a relay spring portion of an electromagnetic type motor relay based on a substrate temperature, detected by a sensor, and is of a substrate that is equipped with said electromagnetic type motor relay,
comparing the estimated temperature with a given temperature, and
controlling a motor current flowing in said electromagnetic type motor relay based on said comparing,
wherein said estimating the temperature comprises:
    accumulating detected each-phase current values of a three-phase brushless DC motor,
    selecting a maximum value of said accumulated detected each-phase current values,
    calculating a relay-spring-portion-temperature based on a sum of said maximum value and a relay-coil-portion-temperature estimated-value, and
    adding said substrate temperature and said relay-spring-portion-temperature, and
    outputting said relay-spring-portion-temperature estimated-value.

* * * * *

UNITED STATES PATENT AND TRADEMARK OFFICE
CERTIFICATE OF CORRECTION

PATENT NO.        : 9,278,708 B2
APPLICATION NO.   : 14/131809
DATED             : March 8, 2016
INVENTOR(S)       : Kouichi Satoh, Keiji Kashimoto and Haruhiko Kamiguchi It is certified that error appears in the above-identified patent and that said Letters Patent is hereby corrected as shown below:

Title page

(72) Inventors: Delete: "Kouichi; Satoh (Maebashi, JP)" and insert --Satoh; Kouichi (Maebashi, JP)--

Signed and Sealed this
Third Day of May, 2016

Michelle K. Lee
*Director of the United States Patent and Trademark Office*